(12) United States Patent
Nakajima

(10) Patent No.: US 9,547,404 B2
(45) Date of Patent: Jan. 17, 2017

(54) TOUCH PANEL

(75) Inventor: Takashi Nakajima, Shinagawa (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 861 days.

(21) Appl. No.: 12/483,468

(22) Filed: Jun. 12, 2009

(65) Prior Publication Data

US 2009/0314551 A1 Dec. 24, 2009

(30) Foreign Application Priority Data

Jun. 24, 2008 (JP) ................. 2008-164971

(51) Int. Cl.
G06F 3/045 (2006.01)

(52) U.S. Cl.
CPC .................. G06F 3/045 (2013.01)

(58) Field of Classification Search
CPC .................................. G06F 3/045
USPC ....................... 345/174; 178/18.05
See application file for complete search history.

(56) References Cited

U.S. PATENT DOCUMENTS

| | | | |
|---|---|---|---|
| 5,777,604 A * | 7/1998 | Okajima et al. | 345/173 |
| 5,815,141 A * | 9/1998 | Phares | G06F 3/045 178/18.05 |
| 6,088,024 A * | 7/2000 | Yamagata | 345/173 |
| 6,208,332 B1 * | 3/2001 | Ikegami | 345/174 |
| 7,236,160 B2 * | 6/2007 | Kong | G06F 3/045 178/18.01 |
| 2003/0122796 A1 * | 7/2003 | Kong | 345/173 |

FOREIGN PATENT DOCUMENTS

| | | |
|---|---|---|
| JP | 63-208923 | 8/1988 |
| JP | 9-45184 | 2/1997 |
| JP | 2000-242429 | 9/2000 |
| JP | 2002-287889 | 10/2002 |

(Continued)

OTHER PUBLICATIONS

Japanese Office Action mailed May 8, 2012 issued in corresponding Japanese Patent Application No. 2008-164971.

(Continued)

*Primary Examiner* — Nicholas Lee
(74) *Attorney, Agent, or Firm* — Staas & Halsey LLP

(57) ABSTRACT

An analog resistive-film touch panel comprises: a plurality of transparent conductive film regions arranged along a given direction on a first member, wherein the transparent conductive film regions are formed on a surface facing a second member, and adjacent transparent conductive film regions are electrically insulated from each other; driving electrode pairs respectively provided in the transparent conductive film regions; a detection electrode pair formed on the second member whose surface facing the first member is coated with a transparent conductive film, wherein electrodes forming the detection electrode pair are arranged so as to face each other in a direction orthogonal to the direction in which electrodes forming each of the driving electrode pairs face each other; and discriminating means for discriminating, based on a voltage value detected via the detection electrode pair, which of the plurality of transparent conductive film regions has been caused to touch the transparent conductive film on the second member.

7 Claims, 18 Drawing Sheets

(56) References Cited

FOREIGN PATENT DOCUMENTS

| JP | 2005-049978 | * | 2/2005 |
| JP | 2005-49978 | | 2/2005 |
| JP | 2006-39667 | | 2/2006 |
| JP | 2006-202006 | | 8/2006 |
| TW | 493137 | | 7/2002 |
| TW | 498266 | | 8/2002 |
| TW | I249708 | | 2/2006 |
| TW | I253584 | | 4/2006 |

OTHER PUBLICATIONS

Partial Translation of JP 2005-49978.
Taiwanese Office Action mailed Dec. 20, 2012, issued in corresponding Taiwanese Patent Application No. 10121468520.

* cited by examiner

Fig.18

|   | A | B | C | D | E | IMAGE INFORMATION |
|---|---|---|---|---|---|---|
| ANALYZED PATTERNS |   |   |   |   |   |   |
| RECOGNITION 1 |   |   | ○ | ○ |   |   |
| RECOGNITION 2 |   | ○ | ○ |   |   | MOVE TO LEFT |
|   | ○ |   | ○ |   |   | ENLARGE+MOVE TO LEFT |
|   |   |   |   | ○ | ○ | ENLARGE+MOVE TO RIGHT |

Fig.19

|   | A | B | C | D | E | IMAGE INFORMATION |
|---|---|---|---|---|---|---|
| ANALYZED PATTERNS |   |   |   |   |   |   |
| RECOGNITION 1 | ○ |   | ○ |   |   |   |
| RECOGNITION 2 |   |   | ○ |   | ○ | MOVE TO RIGHT |
|   |   | ○ | ○ |   |   | REDUCE+MOVE TO LEFT |
|   |   |   |   | ○ | ○ | REDUCE+MOVE TO RIGHT |

TOUCH PANEL

BACKGROUND OF THE INVENTION

1. Field of the Invention

The present invention relates to an analog resistive-film touch panel.

2. Description of the Related Art

A touch panel is an input device typically used to provide input directly on a display screen, and is implemented by combining a coordinate detection function with a display function. Unlike other pointing devices such as a mouse, etc., that provide relative coordinate input, a touch panel, which enables an operator to easily input absolute coordinates, and can provide an interface that better matches the characteristics of human perception. Touch panels are classified as a capacitive-type, electromagnetic inductive-type, ultrasonic-type, etc., according to how the pressing on the panel is sensed. A typical one is the analog resistive-film type described, for example, in Japanese Unexamined Patent Publication No. 2006-39667. An analog resistive-film touch panel comprises planar sheet-like first and second members whose facing surfaces are each coated with a transparent conductive film, and when one surface where a potential gradient is formed across the transparent conductive film is caused to touch the transparent conductive film on the other surface by a touch operation on the panel, the absolute coordinates of the touched point on the panel are determined based on the voltage value detected at that other surface.

FIG. 20 is a perspective view illustrating a conventional analog resistive-film touch panel, and FIG. 21 is a cross-sectional view of the conventional analog resistive-film touch panel. It is to be understood that, throughout the different drawings given herein, the same reference numerals designate component elements having the same functions.

Generally, an analog resistive-film touch panel 100 comprises a film 111 and a glass 112, whose facing surfaces are each coated with a transparent conductive film 114 formed from ITO (indium tin oxide), which is a transparent conductive substance. The surface of the film 111 opposite from the surface thereof facing the glass 112 provides the touch operation surface of the touch panel 100. The film 111 and the glass 112 are bonded together, for example, by a double sided adhesive tape. The touch panel 100 is electrically connected to a host (not shown) by a cable 113.

FIGS. 22(a) and 22(b) are diagrams explaining the coordinate detection principle commonly employed in the analog resistive-film touch panel. As shown in FIG. 22(a), an electrode pair consisting of electrodes 121-1 and 121-2 is formed on the ITO-coated surface of the film 111 of the touch panel 100, and an electrode pair consisting of electrodes 122-1 and 122-2 is formed on the ITO-coated surface of the glass 112. The electrodes 121-1 and 121-2 are arranged so as to face each other in a direction orthogonal to the direction in which the electrodes 122-1 and 122-2 face each other.

When the film 111 of the touch panel 100 is touched by a finger, the film 111 deflects in substantially the vertical direction, causing the transparent conductive film formed on the film 111 to touch the transparent conductive film formed on the glass 112 (see point A in the figure). In the illustrated example, when a drive voltage of, for example, 5 volts is applied between the electrodes 121-1 and 121-2, a voltage value Va is detected, as shown in FIG. 22(b), via the electrodes 122-1 and 122-2 formed on the surface of the glass 112. The absolute coordinate of the touched point on the touch operation surface along the direction in which the electrodes 121-1 and 121-2 face each other can be calculated from the ratio of the detected voltage value Va to the voltage value of the voltage (i.e., 5 volts) applied between the electrodes 121-1 and 121-2. Since the method of calculation using such a ratio is based on the premise that the potential gradient of the same potential formed by the drive voltage applied between the electrodes 121-1 and 121-2 changes linearly, the input area where the touch panel 100 can be touched for operation is more or less limited.

FIGS. 23(a) and 23(b) are diagrams explaining the problem that may arise when the analog resistive-film touch panel illustrated in FIGS. 22(a) and 22(b) is touched by a plurality of fingers for operation. As shown in FIG. 23(a), when the film 111 of the touch panel 100 is touched by a plurality of fingers for operation (two fingers in the illustrated example), the film 111 deflects in substantially the vertical direction, causing the transparent conductive film formed on the film 111 to touch the transparent conductive film on the glass 112 at two points (points A and B in the figure). As a result, a voltage value Vc intermediate between the voltages at points A and B is detected, as shown in FIG. 23(b), via the electrodes 122-1 and 122-2 formed on the surface of the glass 112. This means that, when the analog resistive-film touch panel is touched by a plurality of fingers for operation (the so-called multi-touch operation), the plurality of pressed points on the touch panel surface cannot be recognized.

A capacitive type touch panel that can handle such a multi-touch operation is already developed. However, unlike the analog resistive-film type, the capacitive type, because of its operating principles, cannot accept pen input. Furthermore, the capacitive type is not suitable for use in an environment susceptible to static electricity or moisture.

In view of the above problem, it is an object of the present invention to provide an analog resistive-film touch panel that can recognize and discriminate a plurality of pressed positions in a multi-touch operation.

SUMMARY OF THE INVENTION

To achieve the above object, according to a first mode of the present invention, there is provided an analog resistive-film touch panel formed from planar sheet-like first and second members whose facing surfaces are each coated with a transparent conductive film, comprising:

a plurality of transparent conductive film regions arranged along a given direction on the first member, wherein the transparent conductive film regions are formed on the surface facing the second member, and adjacent ones of the transparent conductive film regions are electrically insulated from each other;

driving electrode pairs respectively provided in the transparent conductive film regions, wherein voltages having different voltage values are applied across the respective driving electrode pairs, and a potential gradient is formed across each of the transparent conductive film regions with equipotential lines extending along the direction in which the transparent conductive film regions are arranged;

a detection electrode pair formed on the second member whose surface facing the first member is coated with the transparent conductive film, wherein electrodes forming the detection electrode pair are arranged so as to face each other in a direction orthogonal to the direction in which electrodes forming each of the driving electrode pairs face each other; and discriminating means for discriminating, based on a voltage value detected via the detection electrode pair, which of the plurality of transparent conductive film regions has been caused to touch the transparent conductive film on the second member.

The touch panel according to the first mode of the present invention can be modified so as to be able to recognize a plurality of regions in a multi-touch operation when multiple touches are made along any of the X and Y directions.

An analog resistive-film touch panel according to this modified example comprises:

a first member on which a plurality of transparent conductive film regions are arranged along an X direction, with X-axis electrode pairs respectively provide in the transparent conductive film regions, wherein the transparent conductive film regions are located on a surface opposite from a touch operation surface, and adjacent ones of the transparent conductive film regions are electrically insulated from each other;

a second member on which a plurality of transparent conductive film regions are arranged along a Y direction orthogonal to the X direction, with Y-axis electrode pairs respectively provided in the transparent conductive film regions, wherein the transparent conductive film regions are located on a surface facing the first member, and adjacent ones of the transparent conductive film regions are electrically insulated from each other; and discriminating means for discriminating which of the plurality of transparent conductive film regions arranged along the X direction has been caused to touch any one of the transparent conductive film regions on the second member, based on a voltage value detected via a corresponding one of the Y-axis electrode pairs in an X-axis region detection mode in which voltages having different voltage values are applied across the respective X-axis electrode pairs and a potential gradient is formed across each of the transparent conductive film regions with equipotential lines extending along the X direction, and for discriminating which of the plurality of transparent conductive film regions arranged along the Y direction has been caused to touch any one of the transparent conductive film regions on the first member, based on a voltage value detected via a corresponding one of the X-axis electrode pairs in a Y-axis region detection mode in which voltages having different voltage values are applied to the respective Y-axis electrode pairs and a potential gradient is formed across each of the transparent conductive film regions with equipotential lines extending along the Y direction.

According to a second mode of the present invention, there is provided an analog resistive-film touch panel formed from planar sheet-like first and second members whose facing surfaces are each coated with a transparent conductive film, comprising:

a plurality of transparent conductive film regions arranged along a given direction on the first member, wherein the transparent conductive film regions are formed on the surface facing the second member, and adjacent ones of the transparent conductive film regions are electrically insulated from each other;

detection electrode pairs respectively provided in the transparent conductive film regions, wherein electrodes forming each of the detection electrode pairs are arranged so as to face each other in a direction orthogonal to the direction along which the transparent conductive film regions are arranged;

a driving electrode pair formed on the second member whose surface facing the first member is coated with the transparent conductive film, wherein electrodes forming the driving electrode pair are arranged so as to face each other in a direction parallel to the direction along which the transparent conductive film regions are arranged, and when voltage is applied, a potential gradient is formed with equipotential lines extending along the direction in which the electrodes forming each of the detection electrode pairs face each other; and discriminating means for discriminating, based on a voltage value detected via a corresponding one of the detection electrode pairs, which of the plurality of transparent conductive film regions has been caused to touch the transparent conductive film on the second member.

The touch panel according to the second mode of the present invention can be modified so as to be able to recognize a plurality of regions in a multi-touch operation when multiple touches are made along any of the X and Y directions.

An analog resistive-film touch panel according to this modified example comprises:

a first member on which a plurality of transparent conductive film regions are arranged along an X direction, with X-axis electrode pairs respectively provided in the transparent conductive film regions, wherein the transparent conductive film regions are located on a surface opposite from a touch operation surface, and adjacent ones of the transparent conductive film regions are electrically insulated from each other;

a second member on which a plurality of transparent conductive film regions are arranged along a Y direction orthogonal to the X direction, with Y-axis electrode pairs respectively provided in the transparent conductive film regions, wherein the transparent conductive film regions are located on a surface facing the first member, and adjacent ones of the transparent conductive film regions are electrically insulated from each other; and discriminating means for discriminating which of the plurality of transparent conductive film regions arranged along the X direction has been caused to touch any one of the transparent conductive film regions on the second member, based on a voltage value detected via a corresponding one of the Y-axis electrode pairs in an X-axis region detection mode in which when voltage is applied, a potential gradient is formed across each of the X-axis electrode pairs with equipotential lines extending along the X direction, and for discriminating which of the plurality of transparent conductive film regions arranged along the Y direction has been caused to touch any one of the transparent conductive film regions on the first member, based on a voltage value detected via a corresponding one of the X-axis electrode pairs in a Y-axis region detection mode in which when voltage is applied, a potential gradient is formed across each of the Y-axis electrode pairs with equipotential lines extending along the Y direction.

According to a third mode of the present invention, there is provided an analog resistive-film touch panel formed from planar sheet-like first and second members whose facing surfaces are each coated with a transparent conductive film, comprising:

a plurality of transparent conductive film regions arranged along a given direction on the first member, wherein the transparent conductive film regions are formed on the surface facing the second member, and adjacent ones of the transparent conductive film regions are electrically insulated from each other;

driving electrode pairs respectively provided in the transparent conductive film regions, wherein voltage pulses having different pulse characteristics are applied to the respective driving electrode pairs;

a detection electrode pair formed on the second member whose surface facing the first member is coated with the transparent conductive film, wherein electrodes forming the detection electrode pair are arranged so as to face each other in a direction orthogonal to the direction in which electrodes forming each of the driving electrode pairs face each other; and discriminating means for discriminating, based on the pulse characteristic of the voltage pulse detected via the detection electrode pair, which of the plurality of transparent conductive film regions has been caused to touch the transparent conductive film on the second member.

The touch panel according to the third mode of the present invention can be modified so as to be able to recognize a plurality of regions in a multi-touch operation when multiple touches are made along any of the X and Y directions.

An analog resistive-film touch panel according to this modified example comprises:

a first member on which a plurality of transparent conductive film regions are arranged along an X direction, with X-axis electrode pairs respectively provided in the transparent conductive film regions, wherein the transparent conductive film regions are located on a surface opposite from a touch operation surface, and adjacent ones of the transparent conductive film regions are electrically insulated from each other;

a second member on which a plurality of transparent conductive film regions are arranged along a Y direction orthogonal to the X direction, with Y-axis electrode pairs respectively provided in the transparent conductive film regions, wherein the transparent conductive film regions are located on a surface facing the first member, and adjacent ones of the transparent conductive film regions are electrically insulated from each other; and discriminating means for discriminating which of the plurality of transparent conductive film regions arranged along the X direction has been caused to touch any one of the transparent conductive film regions on the second member, based on a pulse characteristic of a voltage pulse detected via a corresponding one of the Y-axis electrode pairs in an X-axis region detection mode in which voltage pulses having different pulse characteristics are applied to the respective X-axis electrode pairs, and for discriminating which of the plurality of transparent conductive film regions arranged along the Y direction has been caused to touch any one of the transparent conductive film regions on the first member, based on a pulse characteristic of a voltage pulse detected via a corresponding one of the X-axis electrode pairs in a Y-axis region detection mode in which voltage pulses having different pulse characteristics are applied to the respective Y-axis electrode pairs.

BRIEF DESCRIPTION OF THE DRAWINGS

The present invention will be more clearly understood from the description as set below with reference to the accompanying drawings, wherein:

FIG. 18 is a diagram (part 1) explaining a specific example of how the operation direction of the fingers in the multi-touch operation is recognized;

FIG. 19 is a diagram (part 2) explaining a specific example of how the operation direction of the fingers in the multi-touch operation is recognized;

FIG. 22($b$) is a diagram (part 2) explaining the coordinate detection principle commonly employed in the analog resistive-film touch panel;

DESCRIPTION OF THE PREFERRED EMBODIMENTS

Figure 1:
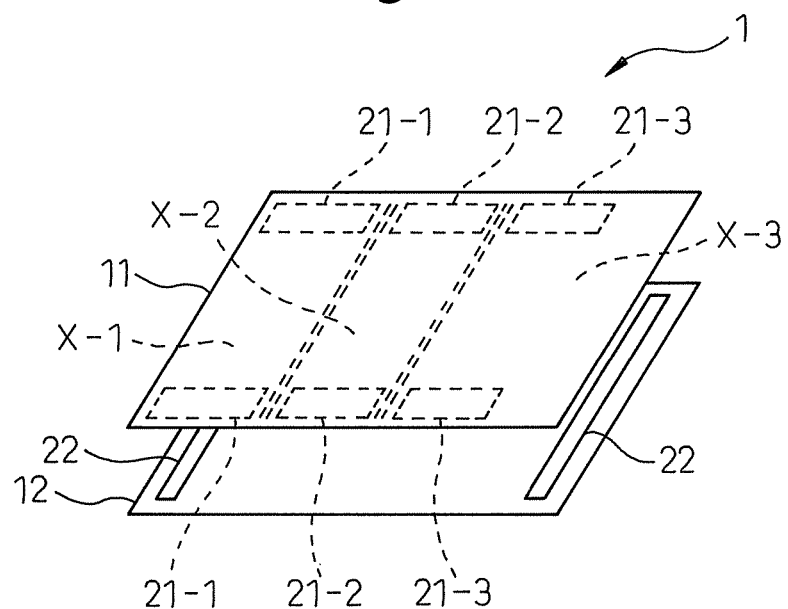
FIG. 1 is a diagram (part 1) explaining a plurality of transparent conductive film regions provided on an analog resistive-film touch panel according to the present invention.
Figure 2:
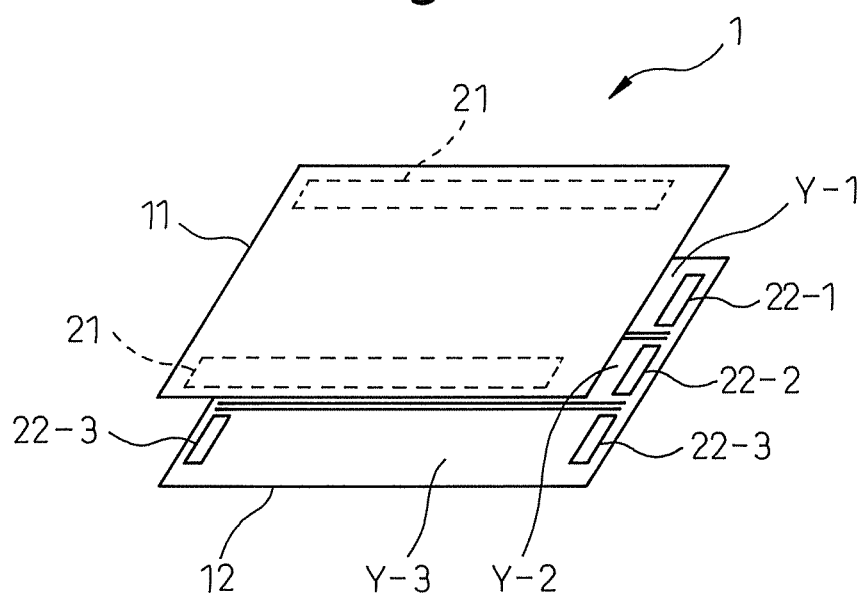
FIG. 2 is a diagram (part 2) explaining the plurality of transparent conductive film regions provided on the analog resistive-film touch panel according to the present invention.
Figure 3:
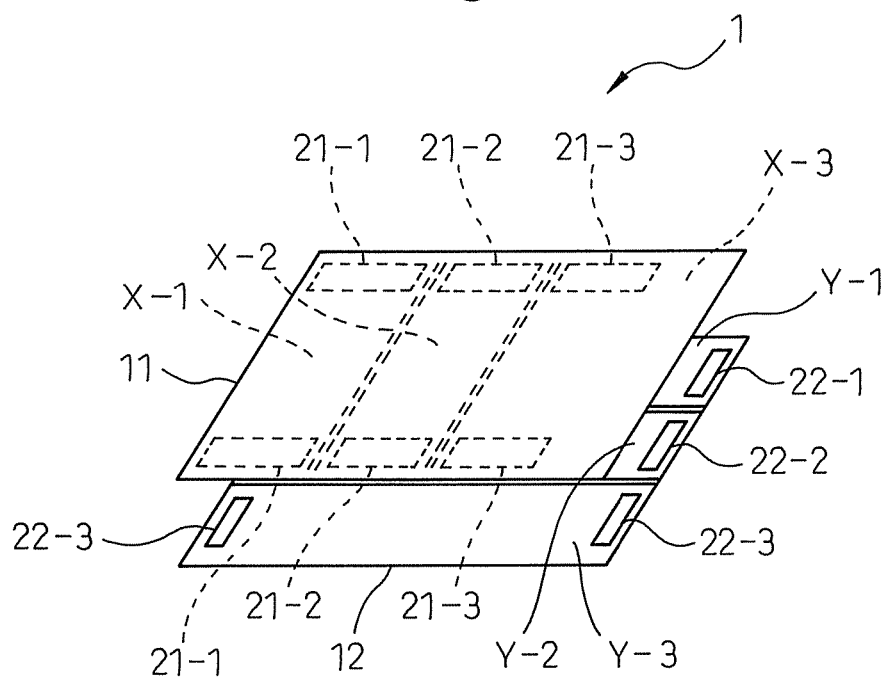
FIG. 3 is a diagram (part 3) explaining the plurality of transparent conductive film regions provided on the analog resistive-film touch panel according to the present invention.

FIGS. 1 to 3 are diagrams explaining a plurality of transparent conductive film regions provided on an analog resistive-film touch panel according to the present invention. The analog resistive-film touch panel 1 according to the present invention comprises planar sheet-like first and second members 11 and 12 whose facing surfaces are each coated with a transparent conductive film. The first member is, for example, a film, and the second member is, for example, a glass. The transparent conductive film formed on each surface is divided into a plurality of regions so that a plurality of positions pressed by a multi-touch operation can be recognized and discriminated. Adjacent transparent conductive film regions are electrically insulated from each other; assuming the use of a pen for input, the spacing between the adjacent regions is made narrower than the width of a commonly used pen tip, i.e., a few millimeters or less. The number of regions is not a limiting factor in the present invention, but should be suitably chosen in accordance with the environment and application where the touch panel is used. Embodiments will be described below by dealing with the case where the conductive film is divided into three regions.

FIG. 1 shows the arrangement of the transparent conductive film regions that can recognize and discriminate a plurality of pressed positions in a multi-touch operation when multiple touches are made along the X direction. In this case, the first member 11 coated with the transparent conductive film is divided perpendicular to the X direction. In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. Driving electrode pairs 21-1, 21-2, and 21-3 are formed in the respective transparent conductive film regions X-1, X-2, and X-3. A detection electrode pair 22 is formed on the second member 12 on the surface thereof that faces the first member 11 and that is coated with the transparent conductive film. The electrodes forming the detection electrode pair 22 are arranged so as to face each other in a direction orthogonal to the direction in which the electrodes forming each of the driving electrode pairs 21-1, 21-2, and 21-3 face each other.

FIG. 2 shows the arrangement of the transparent conductive film regions that can recognize and discriminate a plurality of pressed positions in a multi-touch operation when multiple touches are made along the Y direction. In this case, the second member 12 coated with the transparent conductive film is divided perpendicular to the Y direction. That is, transparent conductive film regions Y-1, Y-2, and Y-3 are arranged along the Y direction on the second member 12. These transparent conductive film regions Y-1, Y-2, and Y-3 are formed on the surface that faces the first member 11, and adjacent transparent conductive film regions are electrically insulated from each other. Driving electrode pairs 22-1, 22-2, and 22-3 are formed in the respective transparent conductive film regions Y-1, Y-2, and Y-3. A detection electrode pair 21 is formed on the first member 11 on the surface thereof that faces the second member 12 and that is coated with the transparent conductive film. The electrodes forming the detection electrode pair 21 are arranged so as to face each other in a direction orthogonal to the direction in which the electrodes forming each of the driving electrode pairs 22-1, 22-2, and 22-3 face each other.

FIG. 3 shows the arrangement of the transparent conductive film regions that can recognize and discriminate a plurality of pressed positions in a multi-touch operation when multiple touches are made along any of the X and Y directions. In this case, the first member 11 coated with the transparent conductive film is divided perpendicular to the X direction, and the second member 12 is divided perpendicular to the Y direction. That is, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. Electrode pairs 21-1, 21-2, and 21-3 are formed in the respective transparent conductive film regions X-1, X-2, and X-3. Likewise, transparent conductive film regions Y-1, Y-2, and Y-3 are arranged along the Y direction on the second member 12. These transparent conductive film regions Y-1, Y-2, and Y-3 are formed on the surface that faces the first member 11, and adjacent transparent conductive film regions are electrically insulated from each other. Electrode pairs 22-1, 22-2, and 22-3 are formed in the respective transparent conductive film regions Y-1, Y-2, and Y-3. The electrodes forming each of the electrode pairs 21-1, 21-2, and 21-3 are arranged so as to face each other in a direction orthogonal to the direction in which the electrodes forming each of the electrode pairs 22-1, 22-2, and 22-3 face each other. Then, switching is made between the electrode pairs 21-1, 21-2, and 21-3 and the electrode pairs 22-1, 22-2, and 22-3 so that the former function as the driving electrode pairs and the latter as the detection electrode pairs or vice versa, depending on the direction along which the plurality of regions are to be detected.

Figure 4:
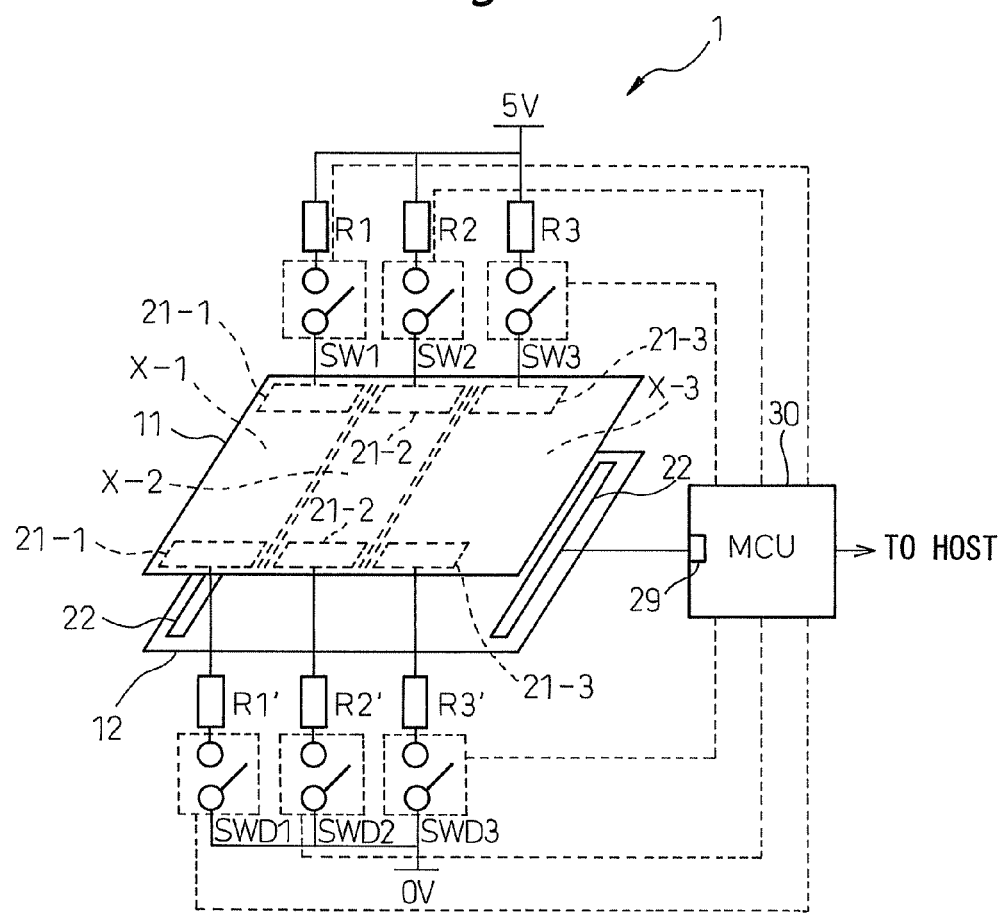
FIG. 4 is a diagram for explaining a touch panel according to a first embodiment of the present invention.

FIG. 4 is a diagram explaining a touch panel according to a first embodiment of the present invention. The touch panel 1 according to the first embodiment of the present invention is constructed so as to be able to recognize and discriminate a plurality of pressed positions in a multi-touch operation when multiple touches are made along the X direction, as earlier explained with reference to FIG. 1.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. Driving electrode pairs 21-1, 21-2, and 21-3 are formed in the respective transparent conductive film regions X-1, X-2, and X-3. A detection electrode pair 22 is formed on the second member 12 on the surface thereof that faces the first member 11 and that is coated with the transparent conductive film. The electrodes forming the detection electrode pair 22 are arranged so as to face each other in a direction orthogonal to the direction in which the electrodes forming each of the driving electrode pairs 21-1, 21-2, and 21-3 face each other.

Resistors R1 and R1' are connected to the respective electrodes forming the driving electrode pair 21-1, resistors R2 and R2' are connected to the respective electrodes forming the driving electrode pair 21-2, and resistors R3 and R3' are connected to the respective electrodes forming the driving electrode pair 21-3. Between the driving electrode pairs 21-1, 21-2, and 21-3, the combined resistance of the resistors R1 and R1', the combined resistance of the resistors R2 and R2', and the combined resistance of the resistors R3 and R3' are equal in value. However, the resistors R1, R2, and R3 have different resistance values. Consequently, the resistors R1', R2', and R3' also have different resistance values.

Switches SW1 and SWD1, SW2 and SWD2, and SW3 and SWD3, respectively, are connected to the electrodes forming the respective driving electrode pairs 21-1, 21-2, and 21-3. The electrodes to which the resistors R1, R2, and R3 are connected are coupled to a power supply via the respective switches SW1, SW2, and SW3. The power supply applies a voltage of the same value (5 volts in the illustrated example) to each driving electrode pair; here, the voltage is applied to each of the driving electrode pairs 21-1, 21-2, and 21-3 by turning on or off the respective switches SW1 and SWD1, SW2 and SWD2, and SW3 and SWD3. The on/off operation of the switches SW1 and SWD1, SW2 and SWD2, and SW3 and SWD3 is controlled by an MCU (reference numeral 30).

As described above, the combined resistance of the resistors R1 and R1', the combined resistance of the resistors R2 and R2', and the combined resistance of the resistors R3 and R3' are equal in value, while on the other hand, the resistors R1, R2, and R3 have different resistance values; this means that, when voltages of the same value (5 volts in the illustrated example) are applied to the respective driving electrode pairs 21-1, 21-2, and 21-3, voltages of different values are applied across the respective driving electrode pairs 21-1, 21-2, and 21-3. Accordingly, when a given point on the touch operation surface of the first member 11 is touched, causing one of the transparent conductive film regions X-1, X-2, and X-3 to touch the transparent conductive film on the second member 12, the MCU 30 can detect via the detection electrode pair 22 the voltage value unique to the transparent conductive film region where the touched point is located. The MCU 30 obtains the detected voltage value via an AD port 29.

Voltages of the same value are sequentially applied from the power supply to the driving electrode pairs 21-1, 21-2, and 21-3 by turning on or off the respective switches SW1 and SWD1, SW2 and SWD2, and SW3 and SWD3. Here, the voltage application timing differs between the driving electrode pairs 21-1, 21-2, and 21-3. For example, the voltage is applied by switching from one driving electrode pair to the next every several tens of milliseconds.

In the present embodiment, the MCU 30 constitutes discriminating means which, based on the voltage value detected via the detection electrode pair 22, discriminates the driving electrode pair across which the voltage having that voltage value has been applied, and sends to the host a signal indicating that the touch operation surface directly above the transparent conductive film region containing the thus discriminated driving electrode pair has been touched causing that region to touch the transparent conductive film on the second member 12. The discriminating means for discriminating the driving electrode pair may be implemented as the MCU 30 which is a computing device permanently attached to the touch panel 1 as shown here, or may be implemented as a separate independent unit in a computer to which the touch panel 1 is connected.

In this way, the discriminating means (the MCU 30) sequentially obtains the voltage values detected via the detection electrode pair 22 as the power supply sequentially applies the voltages to the respective driving electrode pairs in a prescribed order and timing. Accordingly, when two or three of the transparent conductive film regions X-1, X-2, and X-3 are caused to touch the transparent conductive film on the second member 12 by a multi-touch operation, the voltage values unique to the two or three transparent conductive film regions are detected in a single scan via the detection electrode pair 22. Based on the thus detected two or three voltage values, the discriminating means can discriminate from among the transparent conductive film regions X-1, X-2, and X-3 the two or three transparent conductive film regions that have been caused to touch the transparent conductive film on the second member 12. That is, according to the first embodiment of the present invention, when multiple touches are made along the X direction, the plurality of positions pressed by the touches can be recognized and discriminated.

The touch panel according to the first embodiment of the present invention can also identify the absolute position of any single touch point in a single-touch operation, as in the prior art analog resistive-film touch panel. In this case, first the switches SW1 and SWD1, SW2 and SWD2, and SW3 and SWD3 are all turned off to shut off the application of voltage to the respective driving electrode pairs. Then, with the application of voltage thus shut off to all the driving electrode pairs, voltage is applied to the detection electrode pair 22. The power supply for applying this voltage is not shown in FIG. 4. When the application of voltage to the respective driving electrode pairs is thus shut off by turning off all the switches SW1 and SWD1, SW2 and SWD2, and SW3 and SWD3, if a voltage value is detected via any one of the driving electrode pairs 21-1, 21-2, and 21-3, then the absolute coordinate, along the direction in which the electrodes forming the detection electrode pair 22 face each other (that is, along the X direction), of the touch point at which the transparent conductive film region on the first member 11 has been caused to touch the transparent conductive film on the second member 12 by a touch operation can be determined based on the detected voltage value.

Figure 5:
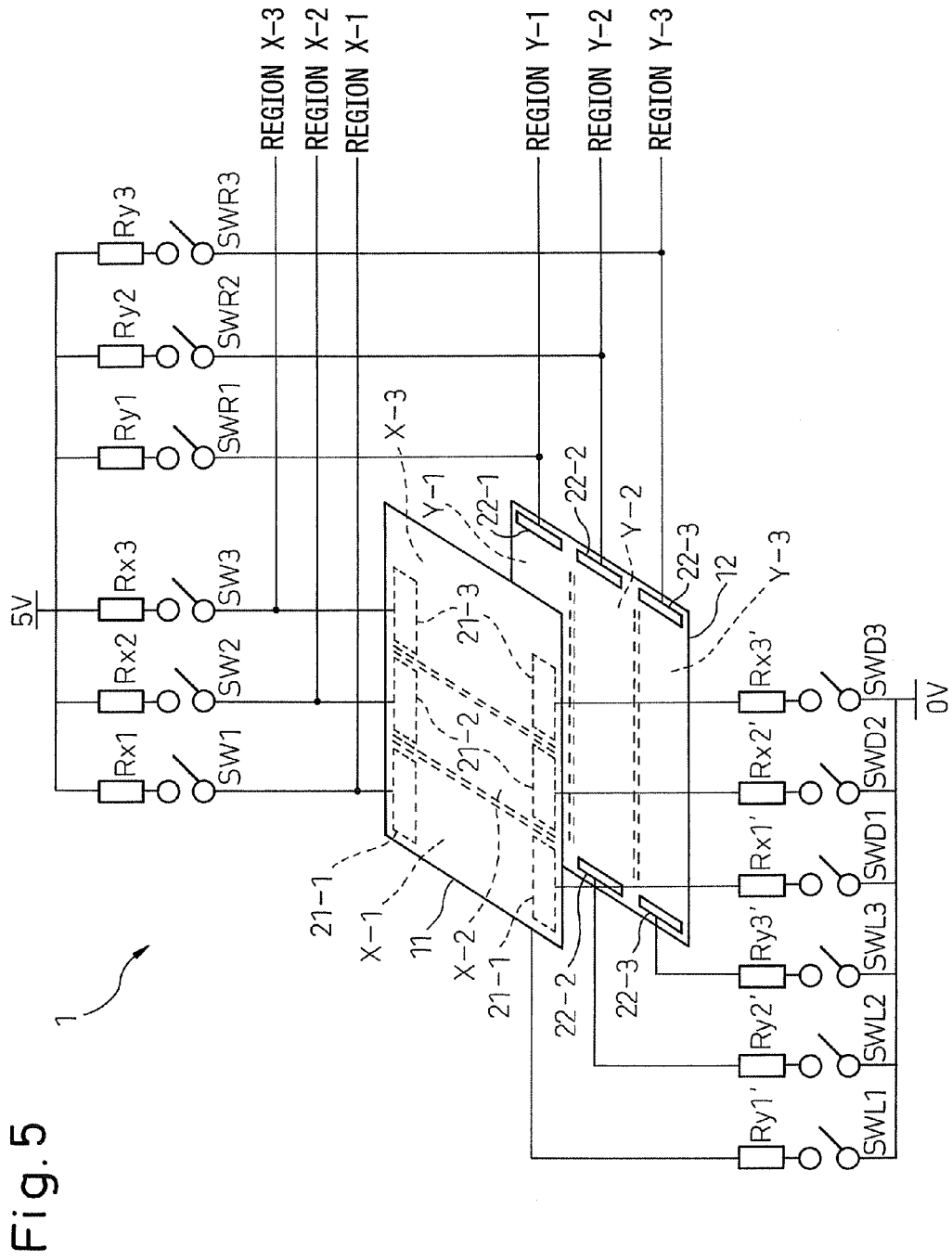
FIG. 5 is a diagram explaining a touch panel according to a modified example of the first embodiment of the present invention.

Next, a description will be given of a modified example in which the touch panel according to the first embodiment of the present invention is modified so as to be able to recognize a plurality of regions in a multi-touch operation when multiple touches are made along any of the X and Y directions. FIG. 5 is a diagram explaining the touch panel according to the modified example of the first embodiment of the present invention. The touch panel 1 according to the modified example of the first embodiment of the present invention is constructed so as to be able to recognize and discriminate a plurality of pressed positions in a multi-touch operation when multiple touches are made along any of the X and Y directions, as earlier explained with reference to FIG. 3.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. X-axis electrode pairs 21-1, 21-2, and 21-3 are formed in the respective transparent conductive film regions X-1, X-2, and X-3. Likewise, transparent conductive film regions Y-1, Y-2, and Y-3 are arranged along the Y direction on the second member 12. These transparent conductive film regions Y-1, Y-2, and Y-3 are formed on the surface that faces the first member 11, and adjacent transparent conductive film regions are electrically insulated from each other. Y-axis electrode pairs 22-1, 22-2, and 22-3 are formed in the respective transparent conductive film regions Y-1, Y-2, and Y-3. The electrodes forming each of the X-axis electrode pairs 21-1, 21-2, and 21-3 are arranged so as to face each other in a direction orthogonal to the direction in which the electrodes forming each of the Y-axis electrode pairs 22-1, 22-2, and 22-3 face each other.

Resistors Rx1 and Rx1' are connected to the respective electrodes forming the X-axis electrode pair 21-1, resistors Rx2 and Rx2' are connected to the respective electrodes forming the X-axis electrode pair 21-2, and resistors Rx3 and Rx3' are connected to the respective electrodes forming the X-axis electrode pair 21-3. Between the X-axis electrode pairs 21-1, 21-2, and 21-3, the combined resistance of the resistors Rx1 and Rx1', the combined resistance of the resistors Rx2 and Rx2', and the combined resistance of the resistors Rx3 and Rx3' are equal in value. However, the resistors Rx1, Rx2, and Rx3 have different resistance values. Consequently, the resistors Rx1', Rx2', and Rx3' also have different resistance values.

Switches SW1 and SWD1, SW2 and SWD2, and SW3 and SWD3, respectively, are connected to the electrodes forming the respective X-axis electrode pairs 21-1, 21-2, and 21-3. The electrodes to which the resistors Rx1, Rx2, and Rx3 are connected are coupled to a power supply via the respective switches SW1, SW2, and SW3. The power supply applies a voltage of the same value (5 volts in the illustrated example) to each X-axis electrode pair; here, the voltage is applied to each of the X-axis electrode pairs 21-1, 21-2, and 21-3 by turning on or off the respective switches SW1 and SWD1, SW2 and SWD2, and SW3 and SWD3. The on/off operation of the switches SW1 and SWD1, SW2 and SWD2, and SW3 and SWD3 is controlled by the MCU (not shown).

When voltages of the same value (5 volts in the illustrated example) are applied to the respective X-axis electrode pairs 21-1, 21-2, and 21-3, voltages of different values are applied across the respective X-axis electrode pairs 21-1, 21-2, and 21-3. Accordingly, when a given point on the touch operation surface of the first member 11 is touched, causing one of the transparent conductive film regions X-1, X-2, and X-3 to touch any one of the transparent conductive film regions on the second member 12, the voltage value unique to the transparent conductive film region where the touched point is located is detected via a corresponding one of the Y-axis electrode pairs 22-1, 22-2, and 22-3.

Resistors Ry1 and Ry1' are connected to the respective electrodes forming the Y-axis electrode pair 22-1, resistors Ry2 and Ry2' are connected to the respective electrodes forming the Y-axis electrode pair 22-2, and resistors Ry3 and Ry3' are connected to the respective electrodes forming the Y-axis electrode pair 22-3. Between the Y-axis electrode pairs 22-1, 22-2, and 22-3, the combined resistance of the resistors Ry1 and Ry1', the combined resistance of the resistors Ry2 and Ry2', and the combined resistance of the resistors Ry3 and Ry3' are equal in value. However, the resistors Ry1, Ry2, and Ry3 have different resistance values. Consequently, the resistors Ry1', Ry2', and Ry3' also have different resistance values.

Switches SWR1 and SWL1, SWR2 and SWL2, and SWR3 and SWL3, respectively, are connected to the electrodes forming the respective Y-axis electrode pairs 22-1, 22-2, and 22-3. The electrodes to which the resistors Ry1, Ry2, and Ry3 are connected are coupled to the power supply via the respective switches SWR1, SWR2, and SWR3. The power supply applies a voltage of the same value (5 volts in the illustrated example) to each Y-axis electrode pair; here, the voltage is applied to each of the Y-axis electrode pairs 22-1, 22-2, and 22-3 by turning on or off the respective switches SWR1 and SWL1, SWR2 and SWL2, and SWR3 and SWL3.

When voltages of the same value (5 volts in the illustrated example) are applied to the respective Y-axis electrode pairs 22-1, 22-2, and 22-3, voltages of different values are applied across the respective Y-axis electrode pairs 22-1, 22-2, and 22-3. Accordingly, when a given point on the touch operation surface of the second member 12 is touched, causing one of the transparent conductive film regions Y-1, Y-2, and Y-3 to touch any one of the transparent conductive film regions on the first member 11, the MCU (not shown) detects, via a corresponding one of the X-axis electrode pairs 21-1, 21-2, and 21-3, the voltage value unique to the transparent conductive film region where the touched point is located.

In the touch panel 1 having the above configuration, switching is made between the X-axis electrode pairs 21-1, 21-2, and 21-3 and the Y-axis electrode pairs 22-1, 22-2, and 22-3 so that the former function as the driving electrode pairs and the latter as the detection electrode pairs or vice versa, depending on the direction along which the plurality of regions are to be detected.

More specifically, when recognizing the pressed regions along the X-axis direction (hereinafter called the "X-axis region detection mode"), voltages of the same value are sequentially applied from the power supply to the X-axis electrode pairs 21-1, 21-2, and 21-3 by turning on or off the respective switches SW1 and SWD1, SW2 and SWD2, and SW3 and SWD3. As a result, each of the X-axis electrode pairs 21-1, 21-2, and 21-3 operates as a driving electrode pair, and voltages of different values are applied to the respective X-axis electrode pairs 21-1, 21-2, and 21-3; here, a potential gradient is formed across the corresponding transparent conductive film region with equipotential lines extending along the X direction. As previously described, the voltage application timing differs between the X-axis electrode pairs 21-1, 21-2, and 21-3. For example, the voltage is applied by switching from one X-axis electrode pair to the next every several tens of milliseconds.

The MCU (not shown) constitutes discriminating means which, based on the voltage value detected via a corresponding MCU of the Y-axis electrode pairs 22-1, 22-2, and 22-3 operating as the detection electrode pairs, discriminates the X-axis electrode pair across which the voltage having that voltage value has been applied, and sends to the host a signal indicating that the touch operation surface directly above the transparent conductive film region containing the thus discriminated X-axis electrode pair has been touched causing that region to touch the transparent conductive film region on the second member 12.

In this way, in the X-axis region detection mode, the discriminating means sequentially obtains the voltage values detected via a corresponding one of the Y-axis electrode pairs 22-1, 22-2, and 22-3 as the power supply sequentially applies the voltages to the respective X-axis electrode pairs in a prescribed order and timing; accordingly, when two or three of the transparent conductive film regions X-1, X-2, and X-3 are caused to touch the transparent conductive film region on the second member 12, the discriminating means can recognize the two or three transparent conductive film regions in a single scan via the Y-axis electrode pair 22-1, 22-2, or 22-3.

The principle is the same when recognizing the pressed regions along the Y-axis direction (hereinafter called the "Y-axis region detection mode"). In other words, voltages of the same value are sequentially applied from the power supply to the Y-axis electrode pairs 22-1, 22-2, and 22-3 by turning on or off the respective switches SWR1 and SWL1, SWR2 and SWL2, and SWR3 and SWL3. As a result, each of the Y-axis electrode pairs 22-1, 22-2, and 22-3 operates as a driving electrode pair, and voltages of different values are applied to the respective Y-axis electrode pairs 22-1, 22-2, and 22-3; a potential gradient is formed across the corresponding transparent conductive film region with equipotential lines extending along the Y direction. As previously described, the voltage application timing differs between the Y-axis electrode pairs 22-1, 22-2, and 22-3. For example, the voltage is applied by switching from one Y-axis electrode pair to the next every several tens of milliseconds.

Based on the voltage value detected via a corresponding one of the X-axis electrode pairs 21-1, 21-2, and 21-3 operating as the detection electrode pairs, the discriminating means discriminates the Y-axis electrode pair across which the voltage having that voltage value has been applied, and sends to the host a signal indicating that the touch operation surface directly above the transparent conductive film region containing the thus discriminated Y-axis electrode pair has been touched causing that region to touch the transparent conductive film region on the first member 11.

In this way, in the Y-axis region detection mode, the discriminating means sequentially obtains the voltage values detected via a corresponding one of the X-axis electrode pairs 21-1, 21-2, and 21-3 as the power supply sequentially applies the voltages to the respective Y-axis electrode pairs in a prescribed order and timing; accordingly, when two or three of the transparent conductive film regions Y-1, Y-2, and Y-3 are caused to touch the transparent conductive film region on the first member 11, the discriminating means can recognize the two or three transparent conductive film regions in a single scan via the X-axis electrode pair 21-1, 21-2, or 21-3.

Figure 6:
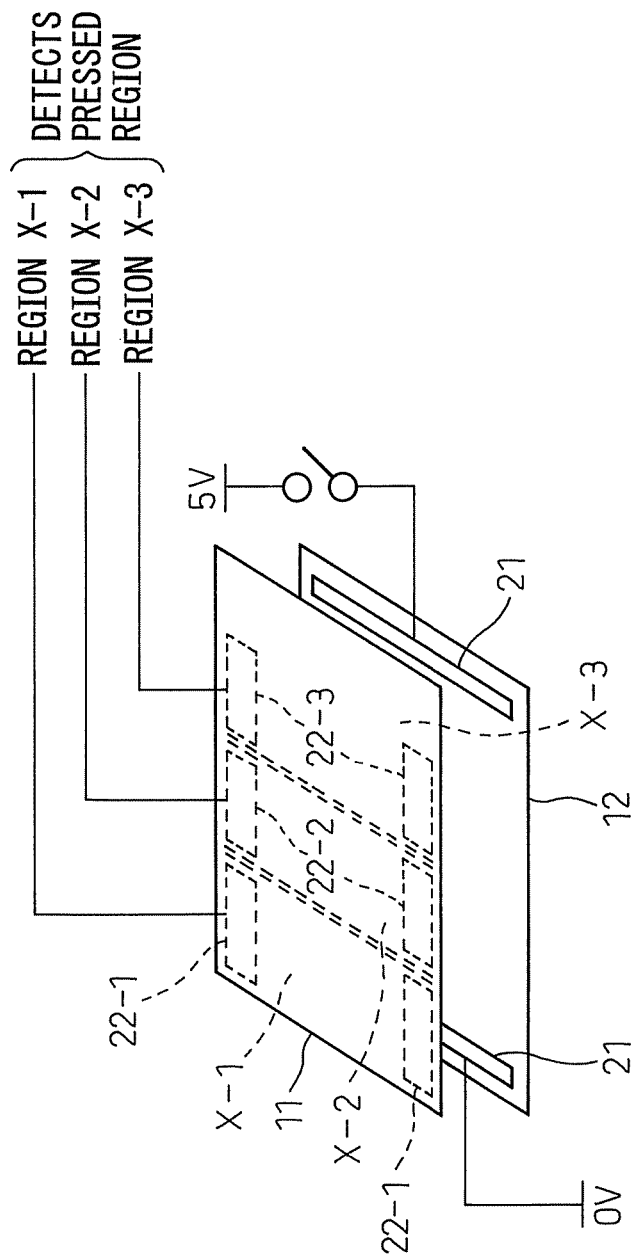
FIG. 6 is a diagram explaining a touch panel according to a second embodiment of the present invention.

FIG. 6 is a diagram explaining a touch panel according to a second embodiment of the present invention. The touch panel 1 according to the second embodiment of the present invention is constructed so as to be able to recognize and discriminate a plurality of pressed positions in a multi-touch operation when multiple touches are made along the X direction, as earlier explained with reference to FIG. 1.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. Detection electrode pairs 22-1, 22-2, and 22-3 are formed in the respective transparent conductive film regions X-1, X-2, and X-3. The electrodes forming each of the detection electrode pairs 22-1, 22-2, and 22-3 are arranged so as to face each other in a direction orthogonal to the direction along which the transparent conductive film regions X-1, X-2, and X-3 are arranged.

A driving electrode pair 21 is formed on the second member 12 on the surface thereof that faces the first member 11 and that is coated with the transparent conductive film. The electrodes forming the driving electrode pair 21 are arranged so as to face each other in a direction orthogonal to the direction in which the electrodes forming each of the detection electrode pairs 22-1, 22-2, and 22-3 face each other. In other words, the driving electrode pair 21 is arranged so that the direction in which the electrodes forming the driving electrode pair 21 face each other is parallel to the direction along which the transparent conductive film regions X-1, X-2, and X-3 are arranged, and when voltage is applied to it, a potential gradient is formed with equipotential lines extending along the direction in which the electrodes forming each of the detection electrode pairs 22-1, 22-2, and 22-3 face each other.

Accordingly, when a given point on the touch operation surface of the first member 11 is touched, causing one of the transparent conductive film regions X-1, X-2, and X-3 to touch the transparent conductive film on the second member 12, a voltage is detected via the detection electrode pair 22-1, 22-2, or 22-3 in the transparent conductive film region X-1, X-2, or X-3 where the touched point is located.

The discriminating means is constructed from an MCU (not shown) which, based on the voltage value detected via the detection electrode pair 22-1, 22-2, or 22-3, discriminates which of the plurality of transparent conductive film regions X-1, X-2, and X-3 has been caused to touch the transparent conductive film on the second member 12. In other words, based on the voltage value detected via the detection electrode pair 22-1, 22-2, or 22-3, the discriminating means discriminates from among the detection electrode pairs 22-1, 22-2, and 22-3 the detection electrode pair via which the voltage having that voltage value has been detected, and sends to the host a signal indicating that the touch operation surface directly above the transparent conductive film region containing the corresponding detection electrode pair has been touched causing that region to touch the transparent conductive film on the second member 12. The discriminating means for discriminating the electrode pair may be implemented as the MCU which is a computing device permanently attached to the touch panel 1, or may be implemented as a separate independent unit in a computer to which the touch panel 1 is connected.

In this way, the discriminating means obtains the voltage value detected via the detection electrode pair 22-1, 22-2, or 22-3 that is formed in the transparent conductive film region located underneath the touch operation surface that has been touched. Accordingly, when two or three of the transparent conductive film regions X-1, X-2, and X-3 are caused to touch the transparent conductive film on the second member 12 by a multi-touch operation, two or three voltage values are detected via the corresponding two or three of the detection electrode pairs 22-1, 22-2, and 22-3. Based on the thus detected two or three voltage values, the discriminating means can discriminate from among the transparent conductive film regions X-1, X-2, and X-3 the two or three transparent conductive film regions that have been caused to touch the transparent conductive film on the second member 12. In other words, according to the second embodiment of the present invention, when multiple touches are made along the X direction, the plurality of positions pressed by the touches can be recognized and discriminated.

Figure 7:
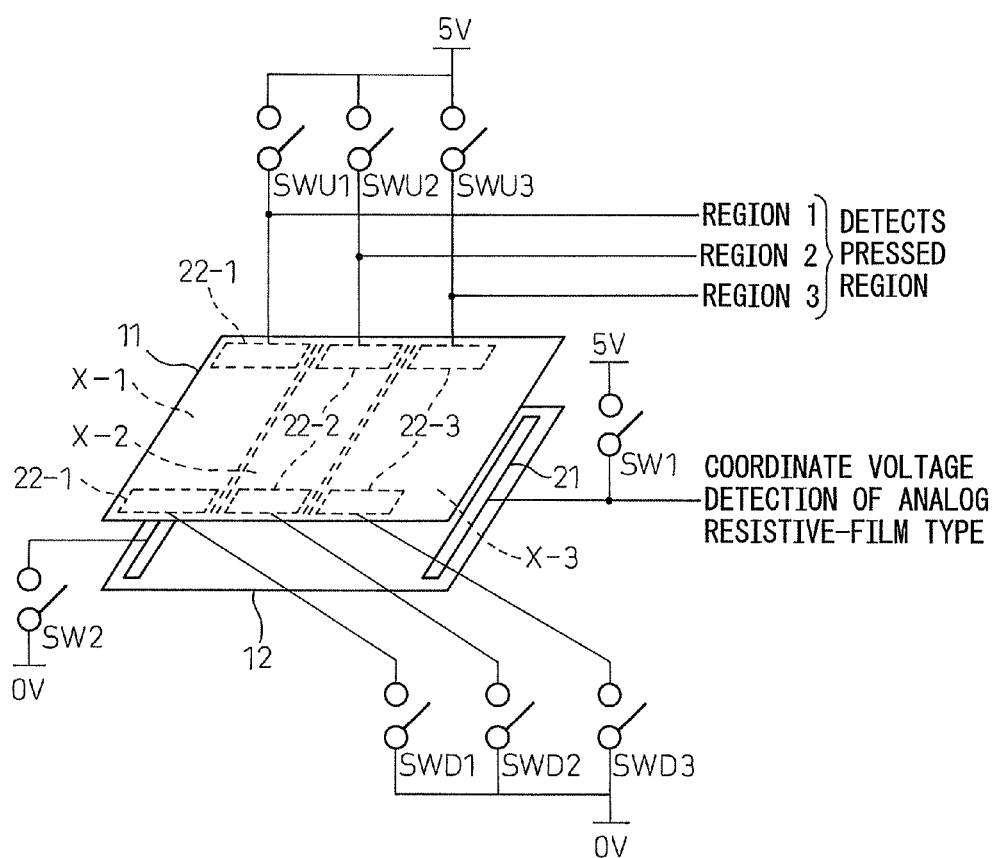
FIG. 7 is a diagram explaining the principle of how the absolute position of a single touch point is identified in a single-touch operation on the touch panel according to the second embodiment of the present invention.

The touch panel according to the second embodiment of the present invention can also identify the absolute position of any single touch point in a single-touch operation, as in the prior art analog resistive-film touch panel. FIG. 7 is a diagram explaining the principle of how the absolute position of a single touch point is identified in a single-touch operation on the touch panel according to the second embodiment of the present invention.

The touch panel 1 includes switches SW1 and SW2 which shut off the application of voltage to the driving electrode pair 21, and a power supply circuit which applies voltages of the same value simultaneously to the detection electrode pairs 22-1, 22-2, and 22-3 when the application of voltage to the driving electrode pair 21 is shut off by the switches SW1 and SW2. In the present embodiment, the power supply circuit comprises switches SWU1 and SWD1, SWU2 and SWD2, and SWU3 and SWD3, and a power supply (5 volts in the illustrated example).

When recognizing a plurality of pressed positions in a multi-touch operation (the region detection mode), the same process as described above is performed under the control of the MCU (not shown) by turning on the switches SW1 and SW2 and turning off the switches SWU1 and SWD1, SWU2 and SWD2, and SWU3 and SWD3.

On the other hand, when identifying the absolute position of a single touch point in a single-touch operation (the coordinate detection mode), the switches SW1 and SW2 are turned off and the switches SWU1 and SWD1, SWU2 and SWD2, and SWU3 and SWD3 are turned on under the control of the MCU (not shown). In this case, voltages of the same value are applied simultaneously to the detection electrode pairs 22-1, 22-2, and 22-3.

Figure 8:
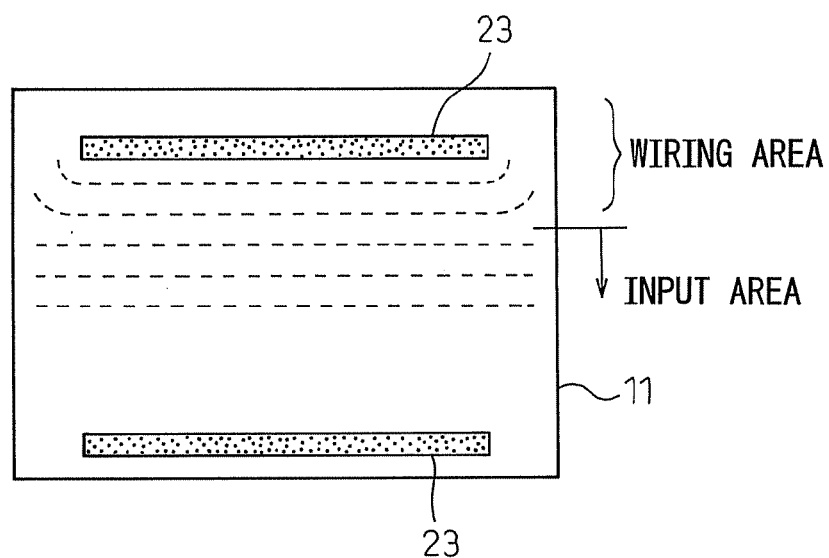
FIG. 8 is a diagram (part 1) explaining the potential gradient that each detection electrode pair forms on the touch panel according to the second embodiment of the present invention.
Figure 9:
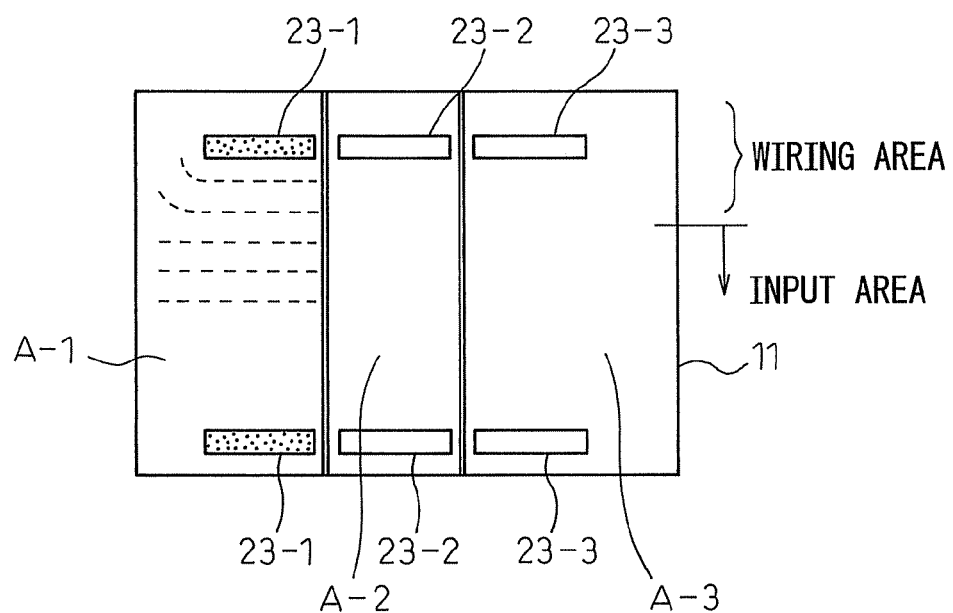
FIG. 9 is a diagram (part 2) explaining the potential gradient that each detection electrode pair forms on the touch panel according to the second embodiment of the present invention.
Figure 10:
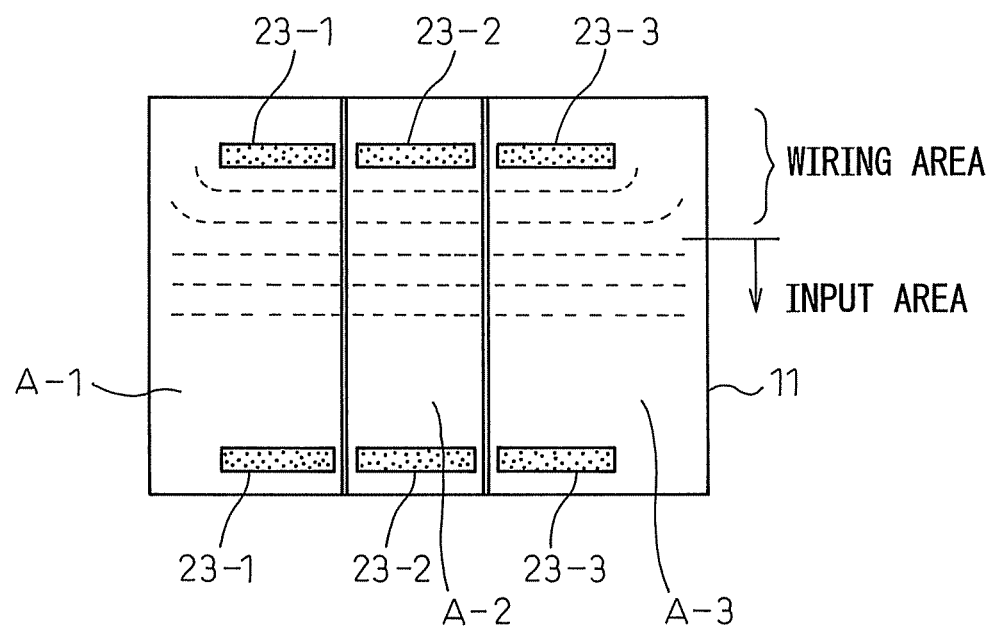
FIG. 10 is a diagram (part 3) explaining the potential gradient that each detection electrode pair forms on the touch panel according to the second embodiment of the present invention.

FIGS. 8 to 10 are diagrams explaining the potential gradient that each detection electrode pair forms on the touch panel according to the second embodiment of the present invention. For example, as shown in FIG. 8, when voltage is applied across the electrode pair 23 formed on the first member 11, a voltage gradient is formed across the electrode pair 23. In FIGS. 8 to 10, equipotential lines are indicated by dashed lines. The equipotential lines near the electrodes forming the electrode pair 23 are more or less displaced from the direction orthogonal to the direction in which the electrodes forming the electrode pair 23 face each other. Therefore, such areas are usually not included in the input area of the touch panel, but used as areas for forming wiring lines around the touch panel. Usually, the wiring areas are covered by a cosmetic panel (bezel) that encases the touch panel. On the other hand, in the area spaced away from the electrodes forming the electrode pair 23, the potential is the same along the direction orthogonal to the direction in which the electrodes forming the electrode pair 23 face each other. Therefore, this area is usually used as the input area of the touch panel.

As shown in FIG. 9, when the transparent conductive film is divided into a plurality of regions, and electrodes 23-1, 23-2, and 23-3 are formed in the respective transparent conductive film regions A-1, A-2, and A-3, if voltage is applied only to the electrodes 23-1, a potential gradient is formed only in the transparent conductive film region A-1. Potential gradients are not formed across the transparent conductive film regions A-2 and A3 which are electrically insulated from the transparent conductive film region A-1. On the other hand, as shown in FIG. 10, when voltage is applied to all the electrodes 23-1, 23-2, and 23-3, potential gradients are formed in all the transparent conductive film regions A-1, A-2, and A-3. Accordingly, even when the transparent conductive film is divided into a plurality of regions as in the present invention, if the same voltage is applied simultaneously to the electrodes 23-1, 23-2, and 23-3 formed in the respective transparent conductive film regions A-1, A-2, and A-3, the potential in the area spaced away from the electrodes forming the respective electrode pairs 23-1, 23-2, and 23-3 becomes the same along the direction orthogonal to the direction in which the electrodes forming each of the electrode pairs 23-1, 23-2, and 23-3 face each other; therefore, this area is used as the input area of the touch panel.

Accordingly, as shown in FIG. 7, when the application of voltage to the driving electrode pair 21 is shut off by the switches SW1 and SW2 (i.e., in the coordinate detection mode), the absolute coordinate, along the direction in which the electrodes forming the electrode pair 23-1, 23-2, or 23-3 face each other, of the touch point at which the transparent conductive film region X-1, X-2, or X-3 on the first member 11 has been caused to touch the transparent conductive film on the second member 12 by a touch operation can be determined based on the voltage value detected via the driving electrode pair 21. The absolute coordinate calculation can be accomplished using a conventional prior known coordinate detection means.

Figure 11:
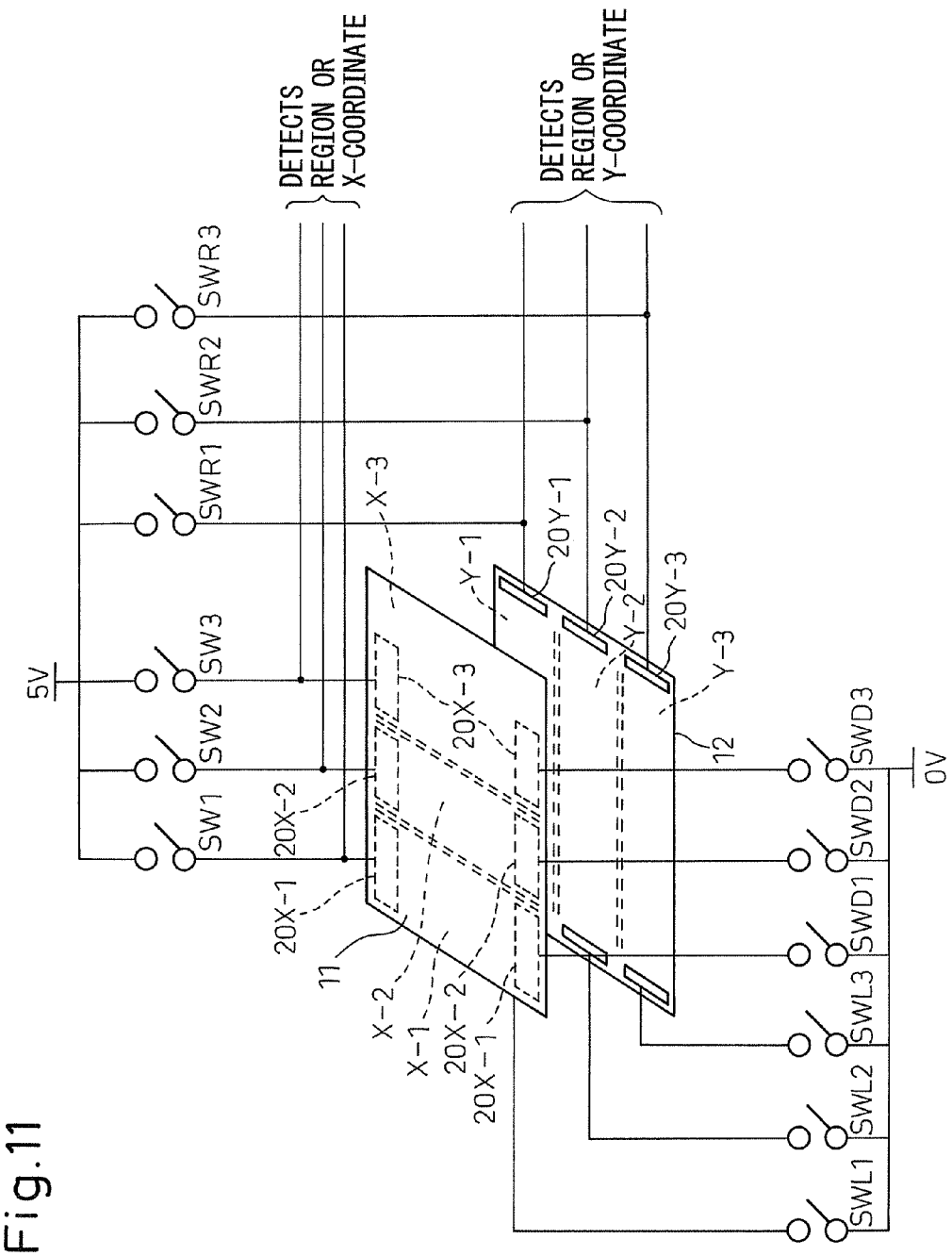
FIG. 11 is a diagram explaining a touch panel according to a modified example of the second embodiment of the present invention.

Next, a description will be given of a modified example in which the touch panel according to the second embodiment of the present invention is modified so as to be able to recognize a plurality of regions in a multi-touch operation when multiple touches are made along any of the X and Y directions. FIG. 11 is a diagram explaining the touch panel according to the modified example of the second embodiment of the present invention. The touch panel 1 according to the modified example of the second embodiment of the present invention is constructed so as to be able to recognize and discriminate a plurality of pressed positions in a multi-touch operation when multiple touches are made along any of the X and Y directions, as earlier explained with reference to FIG. 3.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. X-axis electrode pairs 20X-1, 20X-2, and 20X-3 are formed in the respective transparent conductive film regions X-1, X-2, and X-3. Likewise, transparent conductive film regions Y-1, Y-2, and Y-3 are arranged along the Y direction on the second member 12. These transparent conductive film regions Y-1, Y-2, and Y-3 are formed on the surface that faces the first member 11, and adjacent transparent conductive film regions are electrically insulated from each other. Y-axis electrode pairs 20Y-1, 20Y-2, and 20Y-3 are formed in the respective transparent conductive film regions Y-1, Y-2, and Y-3. The electrodes forming each of the X-axis electrode pairs 20X-1, 20X-2, and 20X-3 are arranged so as to face each other in a direction orthogonal to the direction in which the electrodes forming each of the Y-axis electrode pairs 20Y-1, 20Y-2, and 20Y-3 face each other.

Switches SW1 and SWD1, SW2 and SWD2, and SW3 and SWD3, respectively, are connected to the electrodes forming the respective X-axis electrode pairs 20X-1, 20X-2, and 20X-3. The on/off operation of the switches SW1 and SWD1, SW2 and SWD2, and SW3 and SWD3 is controlled by an MCU (not shown).

On the other hand, switches SWR1 and SWL1, SWR2 and SWL2, and SWR3 and SWL3, respectively, are connected to the electrodes forming the respective Y-axis electrode pairs 20Y-1, 20Y-2, and 20Y-3. The on/off operation of the switches SWR1 and SWL1, SWR2 and SWL2, and SWR3 and SWL3 is controlled by the MCU.

In the touch panel 1 having the above configuration, switching is made between the X-axis electrode pairs 20X-1, 20X-2, and 20X-3 and the Y-axis electrode pairs 20Y-1, 20Y-2, and 20Y-3 so that the former function as the driving electrode pairs and the latter as the detection electrode pairs or vice versa, depending on the direction along which the plurality of regions are to be detected.

More specifically, in the X-axis region detection mode for recognizing the pressed regions along the X-axis direction, voltages of the same value are sequentially applied from the power supply to the X-axis electrode pairs 20X-1, 20X-2, and 20X-3 by turning on or off the respective switches SW1 and SWD1, SW2 and SWD2, and SW3 and SWD3. As a result, each of the X-axis electrode pairs 20X-1, 20X-2, and 20X-3 operates as a driving electrode pair, and a potential gradient is sequentially formed across each of the transparent conductive film regions X-1, X-2, and X-3 with equipotential lines extending along the X direction. The voltage application timing differs between the X-axis electrode pairs 20X-1, 20X-2, and 20X-3. For example, the voltage is applied by switching from one X-axis electrode pair to the next every several tens of milliseconds.

The MCU (not shown) constitutes discriminating means which, based on the voltage value detected via a corresponding one of the Y-axis electrode pairs 20Y-1, 20Y-2, and 20Y-3 operating as the detection electrode pairs, discriminates the X-axis electrode pair across which the voltage having that voltage value has been applied, and sends to the host a signal indicating that the touch operation surface directly above the transparent conductive film region containing the thus discriminated X-axis electrode pair has been touched causing that region to touch the transparent conductive film region on the second member 12.

In this way, in the X-axis region detection mode, the discriminating means sequentially obtains the voltage values detected via a corresponding one of the Y-axis electrode pairs 20Y-1, 20Y-2, and 20Y-3 as the power supply sequentially applies the voltages to the respective X-axis electrode pairs in a prescribed order and timing; accordingly, when two or three of the transparent conductive film regions X-1, X-2, and X-3 are caused to touch the transparent conductive film region on the second member 12, the discriminating means can recognize the two or three transparent conductive film regions in a single scan via the Y-axis electrode pair 20Y-1, 20Y-2, or 20Y-3.

On the other hand, in the Y-axis region detection mode for recognizing the pressed regions along the Y-axis direction, voltages of the same value are sequentially applied from the power supply to the Y-axis electrode pairs 20Y-1, 20Y-2, and 20Y-3 by turning on or off the respective switches SWR1 and SWL1, SWR2 and SWL2, and SWR3 and SWL3. As a result, each of the Y-axis electrode pairs 20Y-1, 20Y-2, and 20Y-3 operates as a driving electrode pair, and a potential gradient is formed across each of the transparent conductive film regions Y-1, Y-2, and Y-3 with equipotential lines extending along the Y direction. As previously described, the voltage application timing differs between the Y-axis electrode pairs 20Y-1, 20Y-2, and 20Y-3. For example, the voltage is applied by switching from one Y-axis electrode pair to the next every several tens of milliseconds.

Based on the voltage value detected via a corresponding one of the X-axis electrode pairs 20X-1, 20X-2, and 20X-3 operating as the detection electrode pairs, the discriminating means discriminates the Y-axis electrode pair across which the voltage having that voltage value has been applied, and sends to the host a signal indicating that the touch operation surface directly above the transparent conductive film region containing the thus discriminated Y-axis electrode pair has been touched causing that region to touch the transparent conductive film region on the first member 11.

In this way, in the Y-axis region detection mode, the discriminating means sequentially obtains the voltage values detected via a corresponding one of the X-axis electrode pairs 20X-1, 20X-2, and 20X-3 as the power supply sequentially applies the voltages to the respective Y-axis electrode pairs in a prescribed order and timing; accordingly, when two or three of the transparent conductive film regions Y-1, Y-2, and Y-3 are caused to touch the transparent conductive film on the first member 11, the discriminating means can recognize the two or three transparent conductive film regions in a single scan via the X-axis electrode pair 20X-1, 20X-2, or 20X-3.

The touch panel according to the modified example of the second embodiment of the present invention can also identify the absolute position of any single touch point in a single-touch operation, as in the prior art analog resistive-film touch panel.

In other words, in the Y-axis absolute coordinate detection mode, the switches SW1 and SWD1, SW2 and SWD2, and SW3 and SWD3 are all turned on simultaneously, and voltages of the same value (5 volts in the illustrated example) are applied simultaneously to the X-axis electrode pairs 20X-1, 20X-2, and 20X-3. In this case, the switches SWR1 and SWL1, SWR2 and SWL2, and SWR3 and SWL3 are all turned off.

On the other hand, in the X-axis absolute coordinate detection mode, the switches SWR1 and SWL1, SWR2 and SWL2, and SWR3 and SWL3 are all turned on simultaneously, and voltages of the same value (5 volts in the illustrated example) are applied simultaneously to the Y-axis electrode pairs 20Y-1, 20Y-2, and 20Y-3. In this case, the switches SW1 and SWD1, SW2 and SWD2, and SW3 and SWD3 are all turned off.

In the Y-axis absolute coordinate detection mode, the absolute coordinate, along the direction in which the electrodes forming the X-axis electrode pair 20X-1, 20X-2, or 20X-3 face each other, of the touch point at which the transparent conductive film region X-1, X-2, or X-3 on the first member 11 is caused to touch the transparent conductive film region on the second member 12 by a touch operation can be determined based on the voltage value detected via any one of the Y-axis electrode pairs 20Y-1, 20Y-2, and 20Y-3.

In the X-axis absolute coordinate detection mode, the absolute coordinate, along the direction in which the electrodes forming the Y-axis electrode pair 20Y-1, 20Y-2, or 20Y-3 face each other, of the touch point at which the transparent conductive film region Y-1, Y-2, or Y-3 on the second member 12 has been caused to touch the transparent conductive film region on the first member 11 by a touch operation can be determined based on the voltage value detected via any one of the X-axis electrode pairs 20X-1, 20X-2, and 20X-3.

The absolute coordinate calculation can be accomplished using a conventional prior known coordinate detection means.

Figure 12:
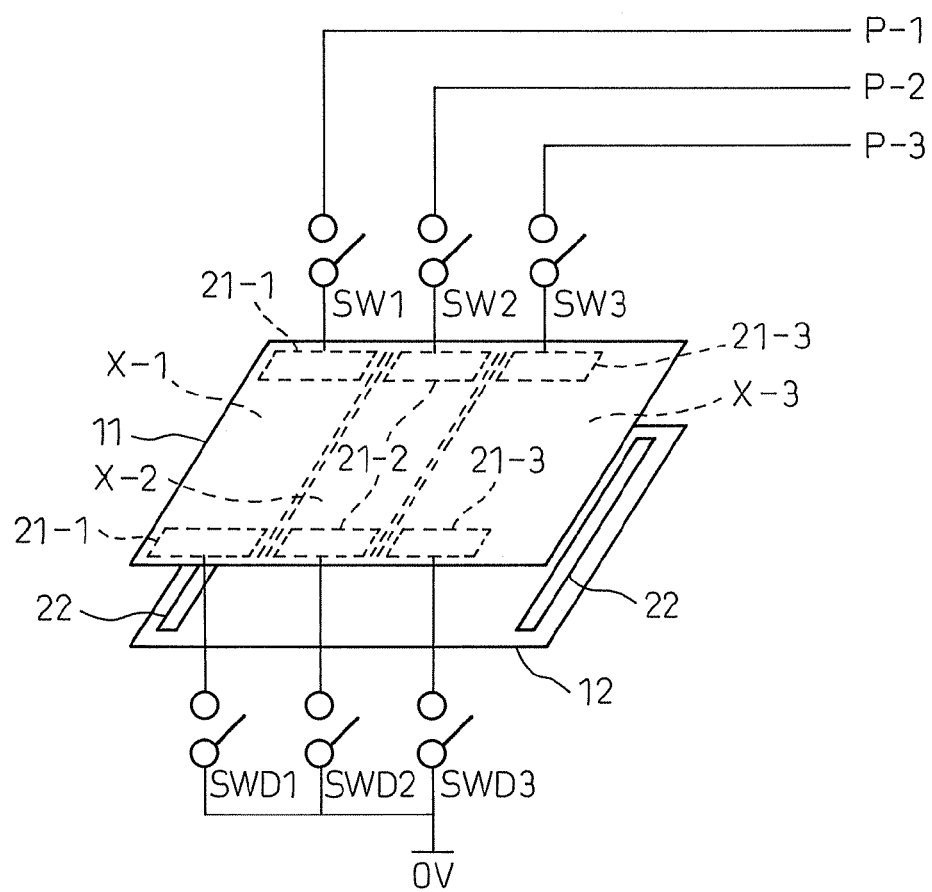
FIG. 12 is a diagram explaining a touch panel according to a third embodiment of the present invention.

FIG. 12 is a diagram explaining a touch panel according to a third embodiment of the present invention. The touch panel 1 according to the third embodiment of the present invention is constructed so as to be able to recognize and discriminate a plurality of pressed positions in a multi-touch operation when multiple touches are made along the X direction, as earlier explained with reference to FIG. 1.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. Driving electrode pairs 21-1, 21-2, and 21-3 are formed in the respective transparent conductive film regions X-1, X-2, and X-3. The electrodes forming each of the driving electrode pairs 21-1, 21-2, and 21-3 are arranged so as to face each other in a direction orthogonal to the direction along which the transparent conductive film regions X-1, X-2, and X-3 are arranged.

A detection electrode pair 22 is formed on the second member 12 on the surface thereof that faces the first member 11 and that is coated with the transparent conductive film. The electrodes forming the detection electrode pair 22 are arranged so as to face each other in a direction orthogonal to the direction in which the electrodes forming each of the driving electrode pairs 21-1, 21-2, and 21-3 face each other. In other words, the direction in which the electrodes forming the detection electrode pair 22 face each other is the same as the direction along which the transparent conductive film regions X-1, X-2, and X-3 are arranged.

Switches SW1 and SWD1, SW2 and SWD2, and SW3 and SWD3, respectively, are connected to the electrodes forming the respective driving electrode pairs 21-1, 21-2, and 21-3. The on/off operation of the switches SW1 and SWD1, SW2 and SWD2, and SW3 and SWD3 is controlled by an MCU (not shown).

Voltage pulses P-1, P-2, and P-3 having different pulse characteristics are applied to the respective driving electrode pairs 21-1, 21-2, and 21-3 formed in the respective transparent conductive film regions X-1, X-2, and X-3. For example, voltage pulses P-1, P-2, and P-3 having different pulse widths are applied to the respective driving electrode pairs 21-1, 21-2, and 21-3. Alternatively, voltage pulse trains P-1, P-2, and P-3 comprising different numbers of pulses per cycle are applied to the respective driving electrode pairs 21-1, 21-2, and 21-3. The voltage pulse application timing differs between the driving electrode pairs 21-1, 21-2, and 21-3. For example, the voltage pulses or pulse trains are applied by switching from one driving electrode pair to the next every several tens of milliseconds by turning on or off the respective switches SW1 and SWD1, SW2 and SWD2, and SW3 and SWD3.

When a given point on the touch operation surface of the first member 11 is touched, causing one of the transparent conductive film regions X-1, X-2, and X-3 to touch the transparent conductive film on the second member 12, a voltage pulse having a pulse characteristic unique to that transparent conductive film region is detected by the detection electrode pair 22 via the driving electrode pair 21-1, 21-2, or 21-3 in the transparent conductive film region X-1, X-2, or X-3 that has been caused to touch.

The MCU (not shown) constitutes discriminating means which, based on the pulse characteristic of the voltage pulse detected via the detection electrode pair 22, discriminates which of the plurality of transparent conductive film regions X-1, X-2, and X-3 has been caused to touch the transparent conductive film on the second member 12. In other words, based on the pulse characteristic of the voltage pulse detected via the detection electrode pair 22, the discriminating means discriminates the driving electrode pair to which the voltage pulse having that pulse characteristic has been applied, and sends to the host a signal indicating that the touch operation surface directly above the transparent conductive film region containing the thus discriminated driving electrode pair has been touched causing that region to touch the transparent conductive film on the second member 12. The discriminating means for discriminating the electrode pair may be implemented as the MCU which is a computing device permanently attached to the touch panel 1, or may be implemented as a separate independent unit in a computer to which the touch panel 1 is connected.

In this way, the discriminating means obtains the pulse characteristic of the voltage pulse detected via the driving electrode pair 21-1, 21-2, or 21-3 formed in the transparent conductive film region located underneath the touch operation surface that has been touched. Accordingly, when two or three of the transparent conductive film regions X-1, X-2, and X-3 are caused to touch the transparent conductive film on the second member 12 by a multi-touch operation, the pulse characteristics of two or three voltage pulses are detected in a single scan via the corresponding two or three of the driving electrode pairs 21-1, 21-2, and 21-3. Based on the pulse characteristics of the thus detected two or three voltage pulses, the discriminating means can discriminate from among the transparent conductive film regions X-1, X-2, and X-3 the two or three transparent conductive film regions that have been caused to touch the transparent conductive film on the second member 12. In other words, according to the third embodiment of the present invention, when multiple touches are made along the X direction, the plurality of positions pressed by the touches can be recognized and discriminated.

Figure 13:
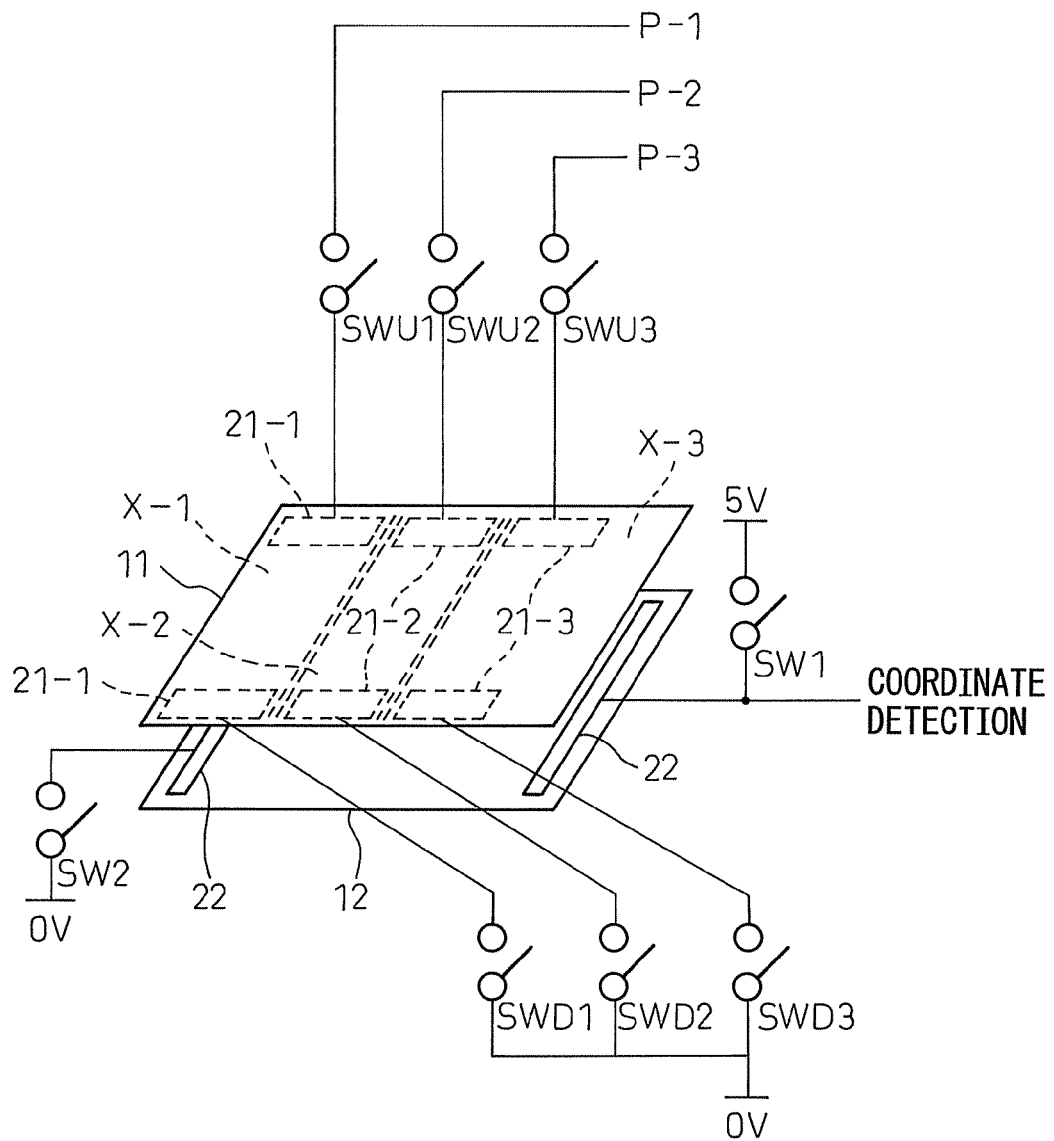
FIG. 13 is a diagram explaining the principle of how the absolute position of a single touch point is identified in a single-touch operation on the touch panel according to the third embodiment of the present invention.

The touch panel according to the third embodiment of the present invention can also identify the absolute position of any single touch point in a single-touch operation, as in the prior art analog resistive-film touch panel. FIG. 13 is a diagram for explaining the principle of how the absolute position of a single touch point is identified in a single-touch operation on the touch panel according to the third embodiment of the present invention.

The touch panel 1 includes switches SWU1 and SWD1, SWU2 and SWD2, and SWU3 and SWD3 which shut off the application of voltage pulses to the respective driving electrode pairs 21-1, 21-2, and 21-3, and a power supply circuit which applies voltage to the detection electrode pair 22 when the application of voltage pulses to all the driving electrode pairs 21-1, 21-2, and 21-3 is shut off by the switches SWU1 and SWD1, SWU2 and SWD2, and SWU3 and SWD3. In the present embodiment, the power supply circuit comprises switches SW1 and SW2 and a power supply (5 volts in the illustrated example).

When recognizing a plurality of pressed positions in a multi-touch operation (the region detection mode), the same process as described above is performed under the control of the MCU (not shown) by turning off the switches SW1 and SW2 and controlling the on/off operation of the respective switches SWU1 and SWD1, SWU2 and SWD2, and SWU3 and SWD3.

On the other hand, when identifying the absolute position of a single touch point in a single-touch operation (the coordinate detection mode), the switches SWU1 and SWD1, SWU2 and SWD2, and SWU3 and SWD3 are turned off and the switches SW1 and SW2 are turned on under the control of the MCU (not shown). In this case, voltage (5 volts in the illustrated example) is applied to the detection electrode pair 22.

When the application of voltage to the driving electrode pairs 21-1, 21-2, and 21-3 is shut off by the switches SWU1 and SWD1, SWU2 and SWD2, and SWU3 and SWD3 (that is, in the coordinate detection mode), the absolute coordinate, along the direction in which the electrodes forming the detection electrode pair 22 face each other, of the touch point at which the transparent conductive film region X-1, X-2, or X-3 on the first member 11 has been caused to touch the transparent conductive film on the second member 12 by a touch operation can be determined based on the voltage value detected via any one of the driving electrode pairs 21-1, 21-2, and 21-3. The absolute coordinate calculation can be accomplished using a conventional prior known coordinate detection means.

Figure 14:
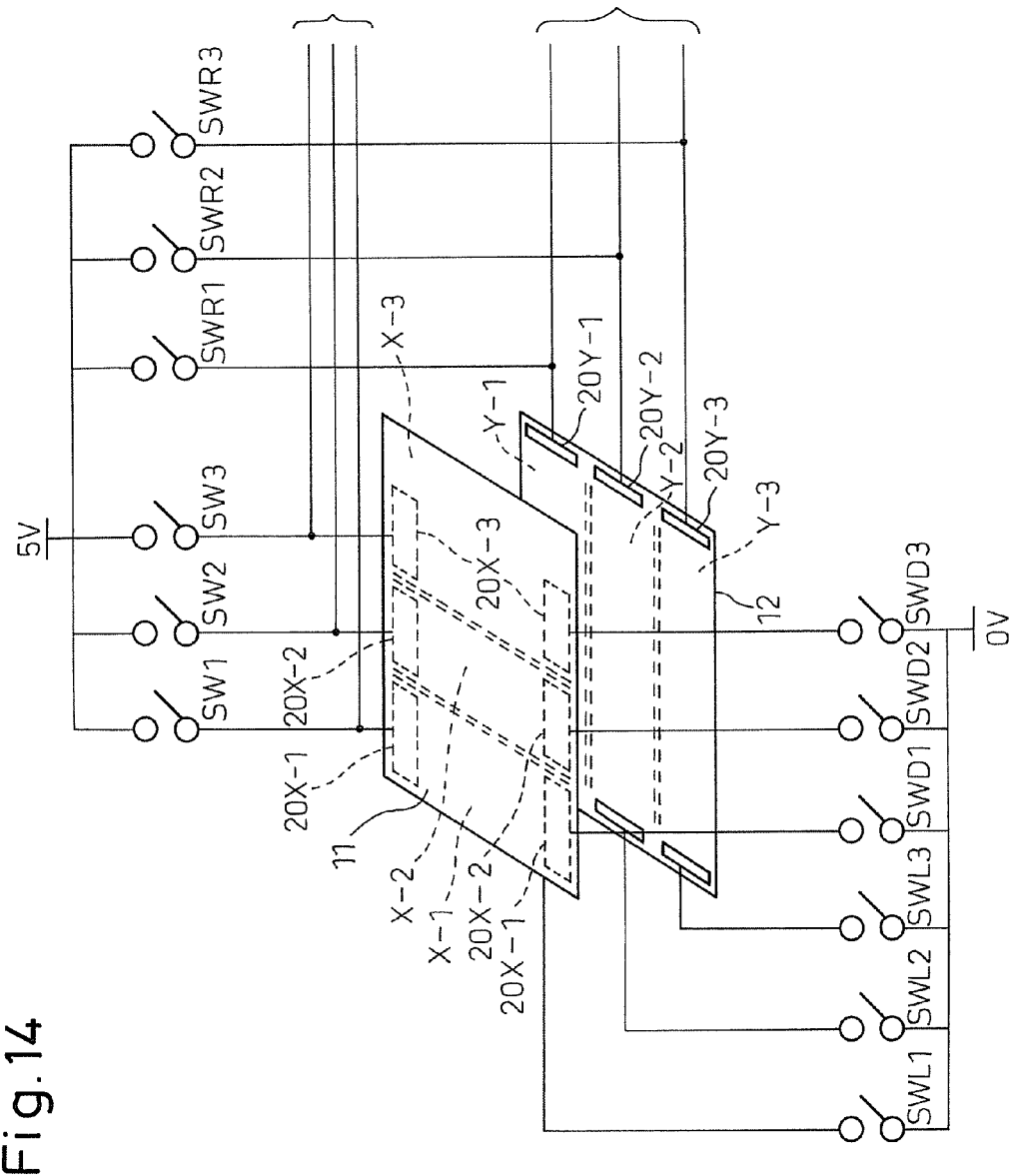
FIG. 14 is a diagram explaining a touch panel according to a modified example of the third embodiment of the present invention.

Next, a description will be given of a modified example in which the touch panel according to the third embodiment of the present invention is modified so as to be able to recognize a plurality of regions in a multi-touch operation when multiple touches are made along any of the X and Y directions. FIG. 14 is a diagram explaining the touch panel according to the modified example of the third embodiment of the present invention. The touch panel 1 according to the modified example of the third embodiment of the present invention is constructed so as to be able to recognize and discriminate a plurality of pressed positions in a multi-touch operation when multiple touches are made along any of the X and Y directions, as earlier explained with reference to FIG. 3.

In other words, transparent conductive film regions X-1, X-2, and X-3 are arranged along the X direction on the first member 11. These transparent conductive film regions X-1, X-2, and X-3 are formed on the surface that faces the second member 12, and adjacent transparent conductive film regions are electrically insulated from each other. X-axis electrode pairs 20X-1, 20X-2, and 20X-3 are formed in the respective transparent conductive film regions X-1, X-2, and X-3. Likewise, transparent conductive film regions Y-1, Y-2, and Y-3 are arranged along the Y direction on the second member 12. These transparent conductive film regions Y-1, Y-2, and Y-3 are formed on the surface that faces the first member 11, and adjacent transparent conductive film regions are electrically insulated from each other. Y-axis electrode pairs 20Y-1, 20Y-2, and 20Y-3 are formed in the respective transparent conductive film regions Y-1, Y-2, and Y-3. The electrodes forming each of the X-axis electrode pairs 20X-1, 20X-2, and 20X-3 are arranged so as to face each other in a direction orthogonal to the direction in which the electrodes forming each of the Y-axis electrode pairs 20Y-1, 20Y-2, and 20Y-3 face each other.

Switches SW1 and SWD1, SW2 and SWD2, and SW3 and SWD3, respectively, are connected to the electrodes forming the respective X-axis electrode pairs 20X-1, 20X-2, and 20X-3. The on/off operation of the switches SW1 and SWD1, SW2 and SWD2, and SW3 and SWD3 is controlled by an MCU (not shown).

On the other hand, switches SWR1 and SWL1, SWR2 and SWL2, and SWR3 and SWL3, respectively, are connected to the electrodes forming the respective Y-axis electrode pairs 20Y-1, 20Y-2, and 20Y-3. The on/off operation of the switches SWR1 and SWL1, SWR2 and SWL2, and SWR3 and SWL3 is controlled by the MCU.

In the touch panel 1 having the above configuration, switching is made between the X-axis electrode pairs 20X-1, 20X-2, and 20X-3 and the Y-axis electrode pairs 20Y-1, 20Y-2, and 20Y-3 so that the former function as the driving electrode pairs and the latter as the detection electrode pairs or vice versa, depending on the direction along which the plurality of regions are to be detected.

More specifically, in the X-axis region detection mode for recognizing the pressed regions along the X-axis direction, voltage pulses having different pulse characteristics are sequentially applied from the power supply to the respective X-axis electrode pairs 20X-1, 20X-2, and 20X-3 operating as the driving electrode pairs, by turning on or off the respective switches SW1 and SWD1, SW2 and SWD2, and SW3 and SWD3. The voltage pulse application timing differs between the X-axis electrode pairs 20X-1, 20X-2, and 20X-3. For example, the voltage pulses are applied by switching from one X-axis electrode pair to the next every several tens of milliseconds.

In the Y-axis region detection mode for recognizing the pressed regions along the Y-axis direction, voltage pulses having different pulse characteristics are sequentially applied from the power supply to the respective Y-axis electrode pairs 20Y-1, 20Y-2, and 20Y-3 operating as the driving electrode pairs, by turning on or off the respective switches SWR1 and SWL1, SWR2 and SWL2, and SWR3 and SWL3. The voltage pulse application timing differs between the Y-axis electrode pairs 20Y-1, 20Y-2, and 20Y-3. For example, the voltage pulses are applied by switching from one Y-axis electrode pair to the next every several tens of milliseconds.

The voltage pulses P-1, P-2, and P-3 applied to the X-axis electrode pairs 20X-1, 20X-2, and 20X-3 and the Y-axis electrode pairs 20Y-1, 20Y-2, and 20Y-3 are, for example, voltage pulses having different pulse widths or voltage pulse trains comprising different numbers of pulses per cycle.

In the X-axis region detection mode, based on the pulse characteristic of the voltage pulse detected via a corresponding one of the Y-axis electrode pairs 20Y-1, 20Y-2, and 20Y-3 operating as the detection electrode pairs, the MCU (not shown) constituting the discriminating means discriminates the X-axis electrode pair to which the voltage pulse having that pulse characteristic has been applied, and sends to the host a signal indicating that the touch operation surface directly above the transparent conductive film region containing the thus discriminated X-axis electrode pair has been touched causing that region to touch the transparent conductive film region on the second member 12.

On the other hand, in the Y-axis region detection mode, based on the pulse characteristic of the voltage pulse detected via a corresponding one of the X-axis electrode pairs 20X-1, 20X-2, and 20X-3 operating as the detection electrode pairs, the MCU (not shown) discriminates the Y-axis electrode pair to which the voltage pulse having that pulse characteristic has been applied, and sends to the host a signal indicating that the touch operation surface directly above the transparent conductive film region containing the thus discriminated Y-axis electrode pair has been touched causing that region to touch the transparent conductive film region on the first member 11.

The touch panel according to the modified example of the third embodiment of the present invention can also identify the absolute position of any single touch point in a single-touch operation, as in the prior art analog resistive-film touch panel.

In other words, in the Y-axis absolute coordinate detection mode, the switches SW1 and SWD1, SW2 and SWD2, and SW3 and SWD3 are all turned on simultaneously, and voltages of the same value (5 volts in the illustrated example) are applied simultaneously to the X-axis electrode pairs 20X-1, 20X-2, and 20X-3. In this case, the switches SWR1 and SWL1, SWR2 and SWL2, and SWR3 and SWL3 are all turned off.

On the other hand, in the X-axis absolute coordinate detection mode, the switches SWR1 and SWL1, SWR2 and SWL2, and SWR3 and SWL3 are all turned on simultaneously, and voltages of the same value (5 volts in the illustrated example) are applied simultaneously to the Y-axis electrode pairs 20Y-1, 20Y-2, and 20Y-3. In this case, the switches SW1 and SWD1, SW2 and SWD2, and SW3 and SWD3 are all turned off.

In the Y-axis absolute coordinate detection mode, the absolute coordinate, along the direction in which the electrodes forming the X-axis electrode pair 20X-1, 20X-2, or 20X-3 face each other, of the touch point at which the transparent conductive film region X-1, X-2, or X-3 on the first member 11 is caused to touch the transparent conductive film region on the second member 12 by a touch operation can be determined based on the voltage value detected via any one of the Y-axis electrode pairs 20Y-1, 20Y-2, and 20Y-3.

In the X-axis absolute coordinate detection mode, the absolute coordinate, along the direction in which the electrodes forming the Y-axis electrode pair 20Y-1, 20Y-2, or 20Y-3 face each other, of the touch point at which the transparent conductive film region Y-1, Y-2, or Y-3 on the second member 12 has been caused to touch the transparent conductive film region on the first member 11 by a touch operation can be determined based on the voltage value detected via any one of the X-axis electrode pairs 20X-1, 20X-2, and 20X-3.

The absolute coordinate calculation can be accomplished using a conventional prior known coordinate detection means.

Figure 15:
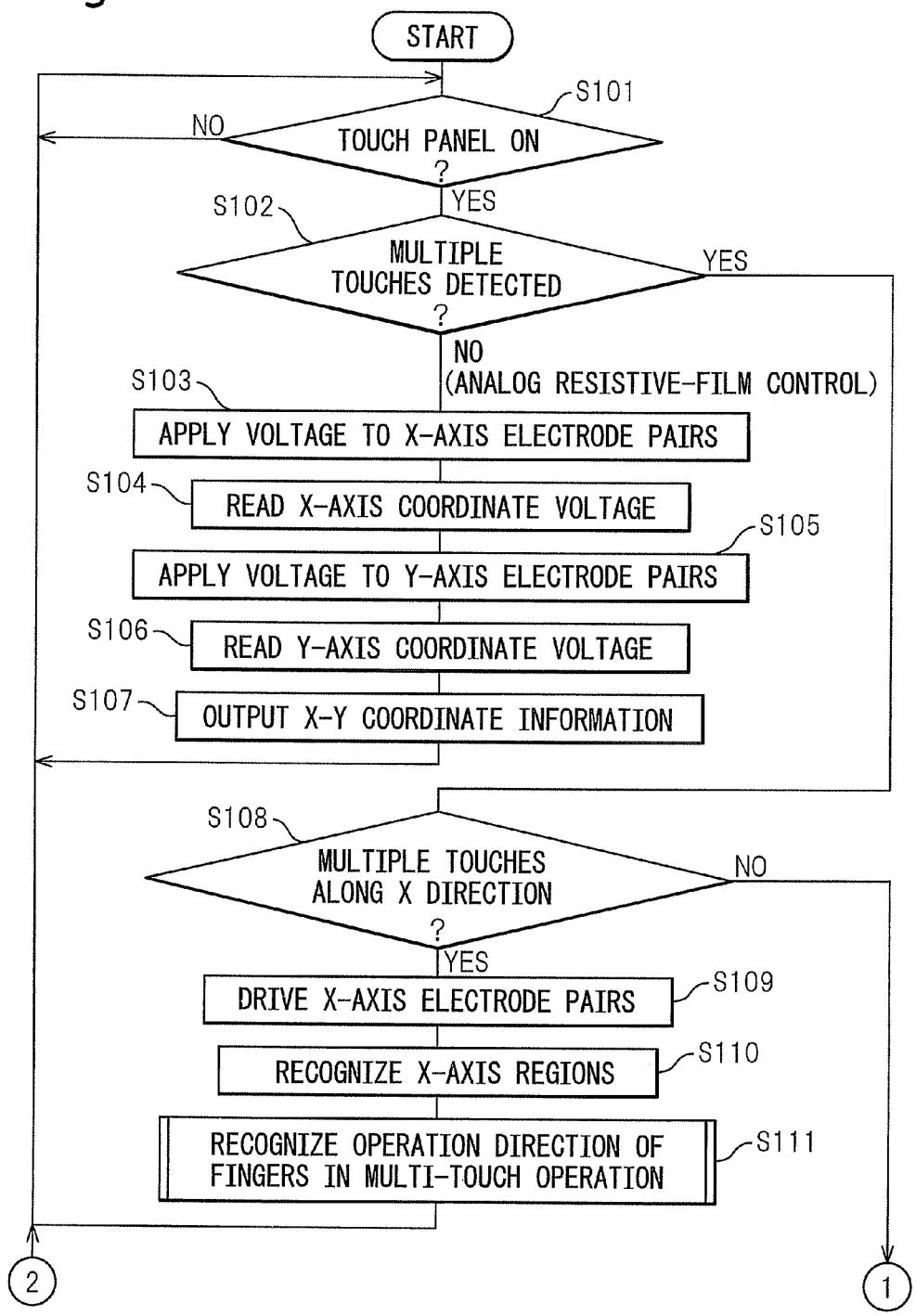
FIG. 15 is a flowchart (part 1) illustrating the operation flow of the touch panel according to the embodiments of the present invention.
Figure 16:
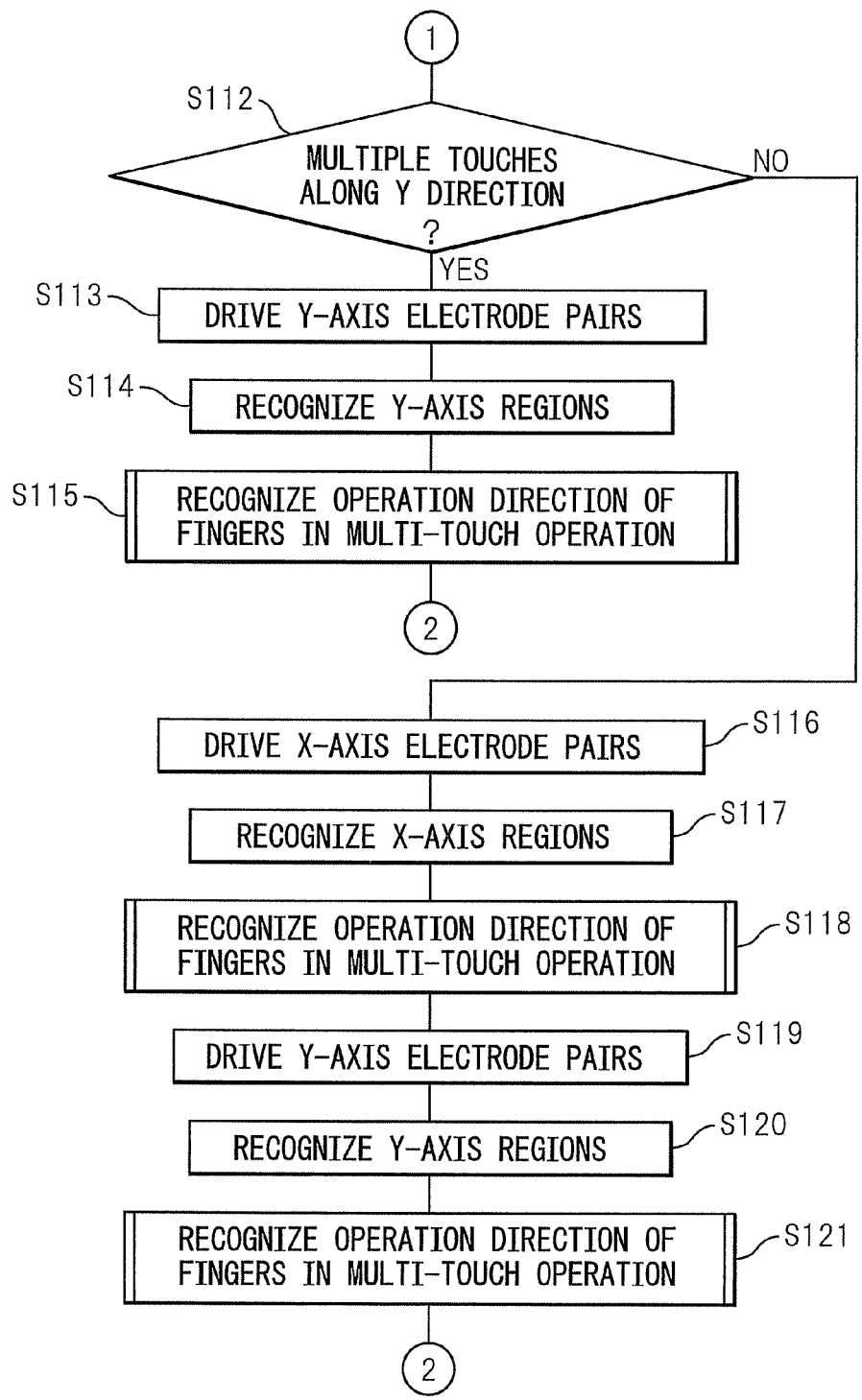
FIG. 16 is a flowchart (part 2) illustrating the operation flow of the touch panel according to the embodiments of the present invention.

FIGS. 15 and 16 are flowcharts illustrating the operation flow of the touch panel according to the embodiments of the present invention. The flowcharts of FIGS. 15 and 16 illustrate the operation flow of the touch panel that can recognize a plurality of regions in a multi-touch operation when multiple touches are made along any of the X and Y directions, and the operation flow illustrated here is applicable to any one of the touch panels shown in the modified examples of the first to third embodiments of the present invention.

First, it is determined in step S101 whether the touch panel is ON. If the touch panel is ON, then it is determined in step S102 whether multiple touches are made on the touch panel. If it is determined that only a single point is touched, the process proceeds to step S103; on the other hand, if it is determined that multiple touches are made, the process proceeds to step S108.

When it is determined in step S102 that only a single point is touched, the touch panel enters the coordinate detection mode, and processing is performed to identify the absolute position of that single point, as in the prior art analog resistive-film touch panel. In other words, in step S103, voltage is applied to the X-axis electrode pairs; in step S104, the voltage value in the X-axis direction is read; in step S105, voltage is applied to the Y-axis electrode pairs; in step S106, the voltage value in the Y-axis direction is read; and in step S107, X-Y coordinate information is output.

On the other hand, when it is determined in step S102 that multiple touches are made, the touch panel enters the region detection mode. First, in step S108, it is determined whether the multiple touches are made along the X-axis direction. If YES, the process proceeds to step S109, but if NO, the process proceeds to step S112.

In step S109, the X-axis electrode pairs are driven, and in step S110, the X-axis regions touched by fingers for operation are recognized. Then, in step S111, the operation direction of the fingers in the multi-touch operation is recognized, the details of which will be described later with reference to FIGS. 17 to 19.

In step S112, it is determined whether the multiple touches are made along the Y-axis direction. If the answer is YES, the process proceeds to step S113, but if the answer is NO, the process proceeds to step S116. In step S113, the Y-axis electrode pairs are driven, and in step 114, the Y-axis regions touched by fingers for operation are recognized. Then, in step S115, the operation direction of the fingers in the multi-touch operation is recognized.

If the answer in step S112 is NO, this means that the multiple touches are made along both the X- and Y-axis directions, so that the process proceeds to step S116. In step S116, the X-axis electrode pairs are driven, and in step 117, the X-axis regions touched by fingers for operation are recognized. Then, in step S118, the operation direction of the fingers in the multi-touch operation is recognized. In step S119, the Y-axis electrode pairs are driven, and in step 120, the Y-axis regions touched by fingers for operation are recognized. Then, in step S121, the operation direction of the fingers in the multi-touch operation is recognized.

Figure 17:
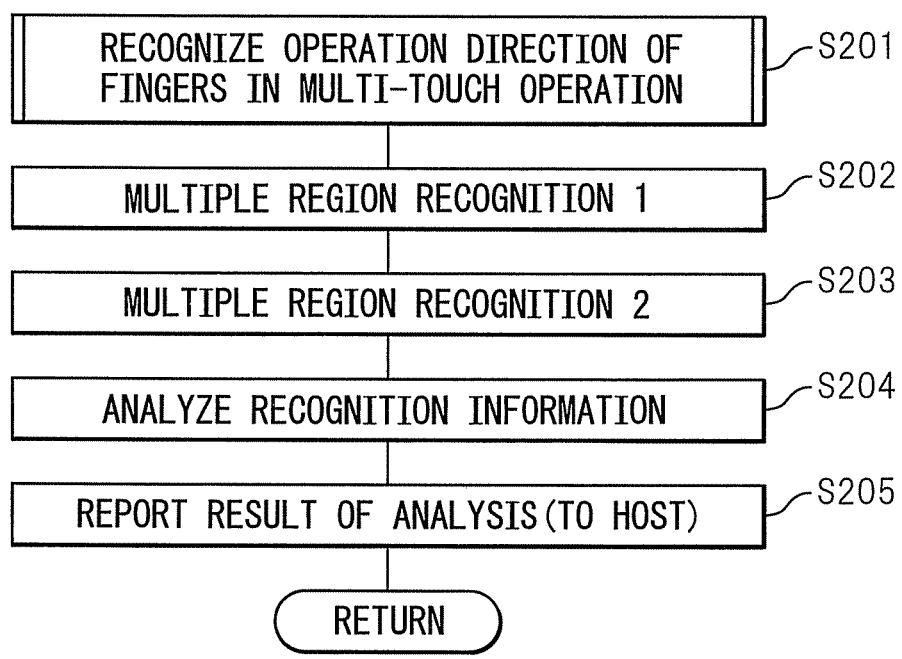
FIG. 17 is a flowchart illustrating the operation flow for recognizing the operation direction of fingers in a multi-touch operation in FIGS. 15 and 16.
Figure 20:
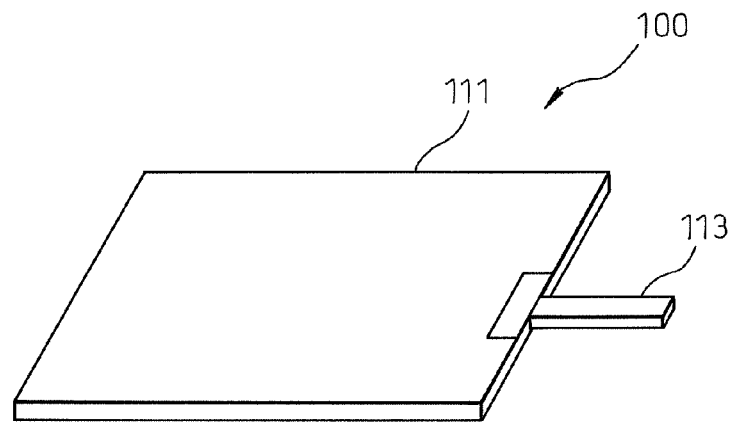
FIG. 20 is a perspective view illustrating a conventional analog resistive-film touch panel.
Figure 21:
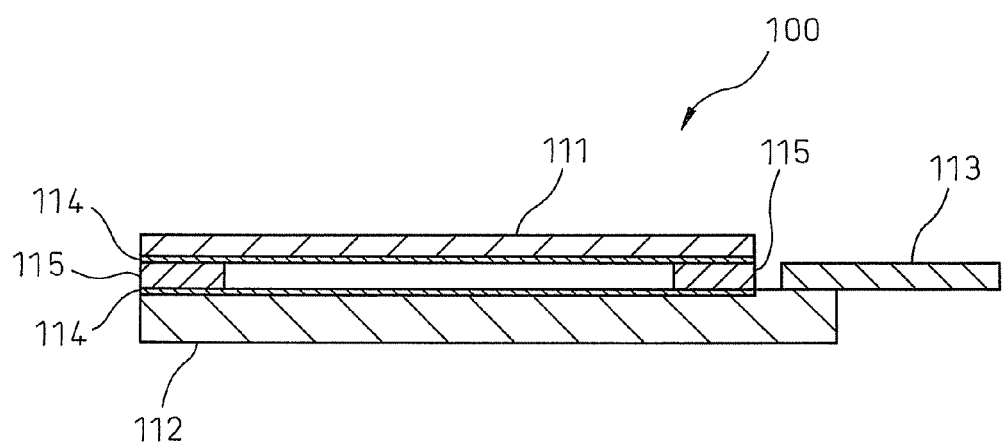
FIG. 21 is a cross-sectional view of the conventional analog resistive-film touch panel.
Figure 22A:
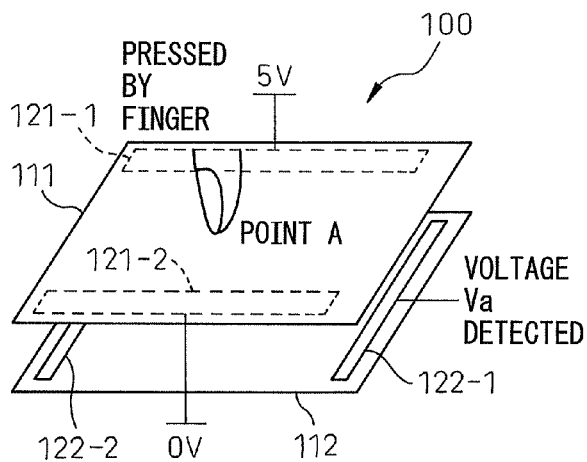
FIG. 22($a$) is a diagram (part 1) explaining the coordinate detection principle commonly employed in the analog resistive-film touch panel.
Figure 22B:
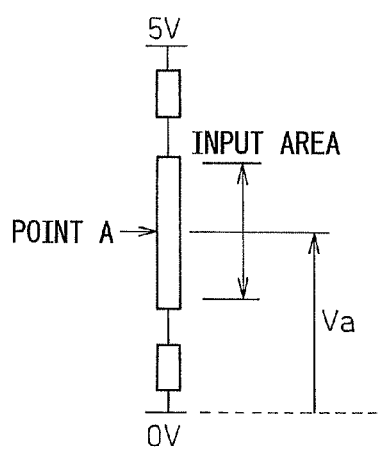
Figure 23A:
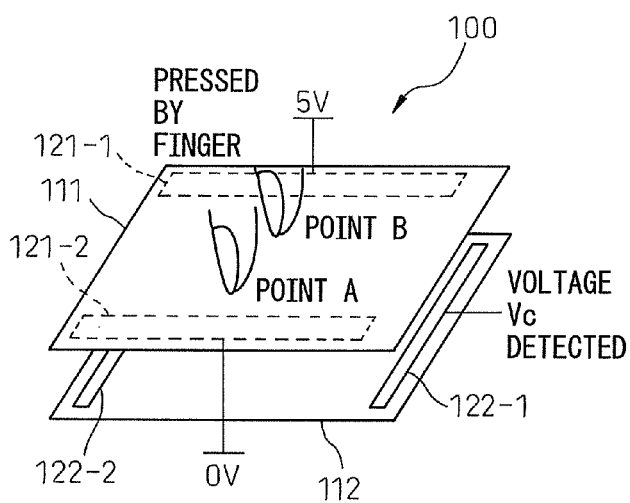
FIG. 23($a$) is a diagram (part 1) explaining the problem that may arise when the analog resistive-film touch panel illustrated in FIGS. 22($a$) and 22($b$) is touched by a plurality of fingers for operation.
FIG. 23(b) is a diagram (part 2) explaining the problem that may arise when the analog resistive-film touch panel illustrated in FIGS. 22(a) and 22(b) is touched by a plurality of fingers for operation.
Figure 23B:
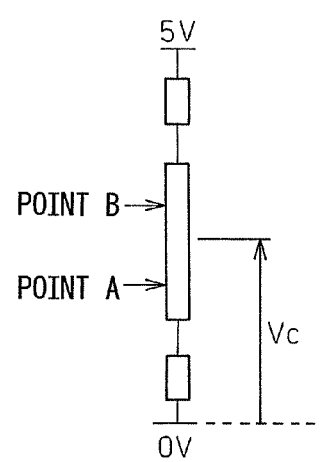

FIG. 17 is a flowchart illustrating the operation flow for recognizing the operation direction of the fingers in the multi-touch operation in FIGS. 16 and 17. Step S201 in FIG. 17 corresponds to the step 111 shown in FIG. 15 and the steps S115, S118, and S121 shown in FIG. 16. In step S202, the plurality of regions touched by the fingers for operation are recognized (recognition 1), and after a predetermined time, the plurality of regions touched by the fingers for operation are recognized in step S203 (recognition 2). For example, when two fingers are pressed onto the touch operation surface of the touch panel, if the fingers are moved while keeping the fingers pressed on the touch operation surface, a difference occurs between the result of the recognition 1 in step S202 and the result of the recognition 2 in step S203. In step S204, recognition information is analyzed, and in step S205, the result of the analysis is reported to the host.

FIGS. 18 and 19 are diagrams for explaining specific examples of how the operation direction of the fingers in the multi-touch operation is recognized. FIGS. 18 and 19 each show an example in which two of the transparent conductive film regions A to E are touched by two fingers for operation; here, the touched points are indicated by circles.

First, as shown in FIG. 18, consider the case where, in the recognition 1 in step S202, the transparent conductive film regions C and D are recognized as touched regions. Then, if it is recognized in the recognition 2 in step S203 that the transparent conductive film regions B and C have been touched for operation, it is analyzed that the two fingers have been moved to the left without changing the spacing between the fingers, and the result of the analysis is reported to the host. In response to the result of the analysis, the host performs processing to scroll the image displayed on the computer screen to the left. On the other hand, if it is recognized in the recognition 2 in step S203 that the transparent conductive film regions A and C have been touched for operation, it is analyzed that the two fingers have been moved to the left while enlarging the spacing between the fingers, and the result of the analysis is reported to the host. In response to the result of the analysis, the host performs processing to scroll the image displayed on the computer screen to the left while enlarging the image accordingly. If it is recognized in the recognition 2 in step S203 that the transparent conductive film regions C and E have been touched for operation, it is analyzed that the two fingers have been moved to the right while enlarging the spacing between the fingers, and the result of the analysis is reported to the host. In response to the result of the analysis, the host performs processing to scroll the image displayed on the computer screen to the right while enlarging the image accordingly.

Next, as shown in FIG. 19, consider the case where, in the recognition 1 in step S202, the transparent conductive film regions B and D are recognized as touched regions. Then, if it is recognized in the recognition 2 in step S203 that the transparent conductive film regions C and E have been touched for operation, it is analyzed that the two fingers have been moved to the right without changing the spacing between the fingers, and the result of the analysis is reported to the host. In response to the result of the analysis, the host performs processing to scroll the image displayed on the computer screen to the right. On the other hand, if it is recognized in the recognition 2 in step S203 that the transparent conductive film regions B and C have been touched for operation, it is analyzed that the two fingers have been moved to the left while reducing the spacing between the fingers, and the result of the analysis is reported to the host. In response to the result of the analysis, the host performs processing to scroll the image displayed on the computer screen to the left while reducing the image accordingly. If it is recognized in the recognition 2 in step S203 that the transparent conductive film regions D and E have been touched for operation, it is analyzed that the two fingers have been moved to the right while reducing the spacing between the fingers, and the result of the analysis is reported to the host. In response to the result of the analysis, the host performs processing to scroll the image displayed on the computer screen to the right while reducing the image accordingly.

The present invention is applicable to an analog resistive-film touch panel. The present invention is advantageous when the display of information processing apparatus is constructed from an analog resistive-film touch panel. Examples of information processing apparatus include mobile phones, personal digital assistants (PDAs), portable music players, portable video players, portable browsers, one-segment tuners, electronic dictionaries, car navigation systems, computers, POS terminals, inventory control terminals, ATMs, multimedia terminals, etc.

According to the analog resistive-film touch panel of the present invention, not only can a plurality of positions pressed by a multi-touch operation be recognized and discriminated, but the absolute coordinates of a position pressed by a single-touch operation can also be obtained.

Compared with the capacitive type, the analog resistive-film touch panel can handle both finger input and pen input, and therefore has the advantage that it has a wide range of applications. For example, multiple touches can be made using two fingers, while on the other hand, handwritten characters can be entered using a pen. The analog resistive-film type has the further advantage that it can be used in an environment susceptible to static electricity or moisture.

What is claimed is:
1. An analog resistive-film touch panel comprising:
a planar sheet-like first member;
a planar sheet-like second member facing the first member;
a plurality of transparent conductive film regions provided on a surface of the first member facing the second member and are aligned in a first direction, adjacent transparent conductive film regions are electrically insulated from each other;
pairs of driving electrodes, each pair of driving electrodes respectively corresponds to and is provided on one of the transparent conductive film regions, each of the driving electrode pairs includes a first electrode and a second electrode that are arranged so as to face each other across the corresponding first transparent conductive film region in a second direction orthogonal to the first direction;
a second transparent conductive film provided on a surface of the second member facing the first member;
a pair of detection electrodes that includes a first detecting electrode and a second detecting electrode provided on the second transparent conductive film, wherein the first detecting electrode and the second detection electrode are arranged so as to face each other across the second transparent conductive film region in the first direction:
pairs of resistors, each of the pairs respectively corresponds to one of the pairs of driving electrodes, each pair of resistors includes a first resistor connected to the first driving electrode of the corresponding pair of driving electrodes and a second resistor connected to the second driving electrode of the corresponding pair of driving electrodes; and
a controller that discriminates which transparent conductive film regions has touched said second transparent conductive film based on voltage value detected through the pair of detecting electrodes, and sequentially applies voltage to one of the first electrodes at a time through the corresponding first resistor;
wherein
voltages having the same voltage values is applied to each first resistor,
a combined resistance value of the first resistor and the second resistor of each of the pairs of resistors are the same, while the resistance value of each of the first resistors are different from each other so that voltage of the different voltage value is respectively applied to each transparent conductive film region and
the controller discriminates the transparent conductive film region that has touched the second transparent conductive film based on the detected voltage value, and the pair of driving electrodes into which the voltage is applied.

2. The touch panel according to claim 1, wherein said controller outputs a signal indicating the transparent conductive film that has touched said second transparent conductive film.

3. The touch panel according to claim 1, further comprising:
a switch for shutting off the application of voltage to said pairs of driving electrodes; and
wherein the controller controls the switch to shut the application of voltage to all of the pairs of driving electrodes and applies voltage to the pair of detection electrodes, and determines, based on a voltage value detected via any one of said pair of driving electrodes when the voltage is applied to said pair of detection electrodes, an absolute coordinate of a touch point along the first direction at which said transparent conductive film region has touched said second transparent conductive film.

4. A resistive-film touch panel comprising:
a first member;
a second member facing the first member;
a first transparent conductive film provided on a surface of the first member facing the second member, the first transparent conductive film includes plurality of transparent conductive film regions aligned in a first direction, in which adjacent transparent conductive film regions are electrically insulated from each other, each transparent conductive film region is provided with a pair of driving electrodes including a first electrode and a second electrode, the first electrode and the second electrode are arranged so as to face each other across the corresponding transparent conductive film region in a second direction orthogonal to the first direction, respectively;
a second transparent conductive film provided on a surface of the second member facing the first member;

a pair of detection electrodes formed on the second member, and includes a first detection electrode and a second detection electrode arranged so as to face each other across the second transparent conductive film in the first direction;

pairs of resistors, each of the pairs of resistors corresponds to one of the transparent conductive film regions, respectively, and each pair of resistors includes a first resistor in which its one end is connected to the first driving electrode of the corresponding transparent conductive film region and a voltage is applied through the other end, and a second resistor in which its one end is connected to the second driving electrode of the corresponding transparent conductive film region; and a controller for sequentially applying voltage to one of the first electrodes at a time, and discriminating, based on a voltage value detected via the detection electrodes and the first resistor in which the voltage is applied, which first transparent conductive film region has touched the second transparent conductive film;

wherein each of the first resistors has different resistance value from one other, while a combined resistance value of the first resistor and the second resistor of each pair of resistors are same, and a voltage of the same voltage value is applied to each of the first resistors so that voltage of the different value is applied to each transparent conductive film region through corresponding driving electrode, respectively.

5. The touch panel according to claim 4, further comprising:

switches, each of which corresponds to one of the transparent conductive film regions, and switches on an off voltage applied to the corresponding first resistor;

wherein the controller controls each switch to sequentially switch on so as to sequentially apply voltage to one of the first resistor at a time.

6. The touch panel according to claim 4, further comprising:

a power source connected to each transparent conductive film region through a corresponding first resistor.

7. The touch panel according to claim 1, wherein:

the controller determines an absolute coordinate of a touch point along the first direction at which the transparent conductive film region has touched the second transparent conductive film, applies voltage to the first detection electrode while not applying voltage to any of the pairs of driving electrodes when the absolute coordinate is to be determined, detects voltage via each pair of driving electrodes, and determines the absolute coordinate based on a voltage value detected via the pairs of driving electrodes.

\* \* \* \* \*

UNITED STATES PATENT AND TRADEMARK OFFICE
CERTIFICATE OF CORRECTION

PATENT NO. : 9,547,404 B2  
APPLICATION NO. : 12/483468  
DATED : January 17, 2017  
INVENTOR(S) : Takashi Nakajima Page 1 of 1

It is certified that error appears in the above-identified patent and that said Letters Patent is hereby corrected as shown below:

In the Claims

Column 26, Line 3, Claim 1:
Delete "direction:" and insert -- direction; --, therefor.

Column 26, Line 67, Claim 4:
Delete "member:" and insert -- member; --, therefor.

Signed and Sealed this
Seventh Day of March, 2017

Michelle K. Lee
*Director of the United States Patent and Trademark Office*